United States Patent [19]

Lu et al.

[11] Patent Number: 5,953,651
[45] Date of Patent: Sep. 14, 1999

[54] CELLULAR ADJUNCT TO A PUBLIC WIRED NETWORK

[75] Inventors: Priscilla Marilyn Lu, San Carlos; Timothy Richard White, Palo Alto, both of Calif.

[73] Assignee: Interwave Communications International, Ltd., Bermuda

[21] Appl. No.: 08/730,642

[22] Filed: Oct. 11, 1996

Related U.S. Application Data

[63] Continuation-in-part of application No. 08/435,709, May 4, 1995, Pat. No. 5,734,699.
[60] Provisional application No. 60/006,454, Nov. 10, 1995.
[51] Int. Cl.[6] .................................................. H04Q 7/24
[52] U.S. Cl. ........................ 455/408; 455/445; 455/560
[58] Field of Search .................................. 455/406, 408, 455/445, 463, 465, 554, 560

[56] References Cited

U.S. PATENT DOCUMENTS

| | | | |
|---|---|---|---|
| 4,726,014 | 2/1988 | Goldman et al. | 370/328 |
| 5,157,709 | 10/1992 | Ohteru | 455/465 |
| 5,386,466 | 1/1995 | Bales et al. | 379/220 |
| 5,442,633 | 8/1995 | Perkins et al. | 370/331 |
| 5,479,483 | 12/1995 | Furuya et al. | 455/433 |
| 5,504,804 | 4/1996 | Widmark et al. | 455/414 |
| 5,506,837 | 4/1996 | Söllner et al. | 370/296 |
| 5,506,887 | 4/1996 | Emery et al. | 455/461 |
| 5,512,884 | 4/1996 | Hesse et al. | 340/825.03 |
| 5,517,555 | 5/1996 | Amadon et al. | 455/408 |
| 5,528,664 | 6/1996 | Slekys et al. | 455/452 |
| 5,528,668 | 6/1996 | Aihara | 455/422 |
| 5,577,031 | 11/1996 | Smith | 370/329 |
| 5,787,355 | 7/1998 | Bannister et al. | 455/554 |

FOREIGN PATENT DOCUMENTS

| | | | |
|---|---|---|---|
| 462 727 A2 | 12/1991 | European Pat. Off. | H04Q 7/04 |
| 462 728 A2 | 12/1991 | European Pat. Off. | H04Q 7/04 |
| 566 407 A2 | 10/1993 | European Pat. Off. | H04Q 7/04 |
| 587 211 A2 | 3/1994 | European Pat. Off. | H04Q 7/04 |
| 595 392 A1 | 5/1994 | European Pat. Off. | H04Q 7/04 |
| 600 681 A1 | 6/1994 | European Pat. Off. | H04Q 7/26 |
| 605 086 A1 | 7/1994 | European Pat. Off. | H04Q 7/04 |
| 605 311 A1 | 7/1994 | European Pat. Off. | H04B 7/26 |
| WO94/26073 | 11/1994 | European Pat. Off. | H04Q 7/04 |
| WO95/24789 | 9/1995 | European Pat. Off. | |
| WO93/11625 | 6/1993 | WIPO | H94M 11/00 |
| WO94/05126 | 3/1994 | WIPO | H04Q 7/04 |

OTHER PUBLICATIONS

J.B. Hollis,"Air Interface, Protocols for a National Mobile Data Network," IEE Collq. (1993) No. 003: Cordless Computing—Systems and User Experience, pp. 1–5.

*Primary Examiner*—Andrew M. Dolinar
*Attorney, Agent, or Firm*—Beyer & Weaver, LLP.

[57] ABSTRACT

A cellular adjunct system for extending telephone service provided by a wired telephone network to a cellular handsets without incurring the costs associated with implementing a full-featured cellular system. The cellular adjunct system includes a base station subsystem and a cellular adjunct control block. The base station subsystem includes radio resource management facilities for permitting the plurality of cellular handsets to communicate with the base station subsystem in a cellular manner. The cellular adjunct control block, which is coupled between the base station subsystem and switching networks in the public wired telephone network, includes a registry, a mobile switching center, and a mini-central office. From the perspective of the public wired telephone network, the cellular handsets appear to be wired telephone sets that are managed by the cellular adjunct control block. The fact that the cellular adjunct system offers wireless advantages typically associated with a standard full-featured cellular system is transparent to the public wired telephone network. When subscriber management for the cellular handsets is handled by the public wired telephone network, the implementation of the cellular adjunct system is substantially simplified.

27 Claims, 12 Drawing Sheets

| IMSI | Phone # | Home Loc | Status | Supplemental Services | |
|---|---|---|---|---|---|
| 0,000,000,001 | 123-6020 | BTS #1 | Available | Fax | • |
| 0,000,000,002 | 123-6021 | BTS #1 | Available | Phone Mail | • |
| 0,000,000,003 | 123-6022 | BTS #2 | Busy | | • |
| | | • • • | | | |
| 270 | 272 | 274 | 276 | 278 | |

FIG. 3

CELLULAR ADJUNCT TO A PUBLIC WIRED NETWORK

This application claims priority under 35 U.S.C. 119(e) of an earlier filed provisional application entitled "Cellular Adjunct To A Public Wired Network" filed Nov. 10, 1995 application Ser. No. 60/006,454 by inventors Priscilla Marilyn Lu and Timothy Richard White.

BACKGROUND OF THE INVENTION

This is a continuation-in-part of commonly assigned co-pending U.S. patent Ser. No. 08/435,709, entitled "Cellular Private Branch Exchange," (Attorney's Docket No. WAVEP001), filed May 4, 1995 (hereinafter Ser. No. 08/435,709), now U.S. Pat. No. 5,734,699.

The following co-pending U.S. patent applications are incorporated herein by reference for all purposes:

"Cellular Private Branch Exchange," (Attorney's Docket No. WAVEP001) filed May 4, 1995 (hereinafter Ser. No. 08/435,709) now U.S. Pat. No. 5,734,699.

"Cellular Communication Network Having Intelligent Switching Nodes," (title as amended) filed May 4, 1995, U.S. Ser. No. 08/435,838Attorney's Docket No. WAVEP004 (hereinafter "Ser. No. 08/435,838") now U.S. Pat. No. 5,577,029.

"Configuration-Independent Methods And Apparatus For Software Communication In A Cellular Network," filed on even date, U.S. Ser. No. (08/730,652), Attorney's Docket No. WAVEP005 (hereinafter "WAVEP005"), now U.S. Pat. No. 5,842,138, and the earlier filed provisional application entitled "Configuration-Independent Methods And Apparatus For Software Communication In A Cellular Network" filed Nov. 10, 1995 Application No. 60/006,455 by inventors Priscilla Marilyn Lu and Timothy Richard White from which that application claims priority under 35 U.S.C. 119(e).

"Spread Spectrum Communication Network Signal Processor," filed on May 4, 1995, Ser. No. 08/434,554, Attorney's Docket No: A-60910 (hereinafter Ser. No. 434,554) now U.S. Pat. No. 5,682,403.

"Cellular Base Station With Intelligent Call Routing," filed on May 4, 1995, Ser. No. 08/434,598, Attorney's Docket No: A-61115 (hereinafter Ser. No. 08/434,598) now U.S. Pat. No. 5,734,979.

"Spread Spectrum Communication Network With Adaptive Frequency Agility," filed on May 4, 1995, Ser. No. 08/434,597, Attorney's Docket No: A-60820 (hereinafter Ser. No. 08/434,597) now U.S. Pat. No. 5,781,582.

For ease of reference, a glossary of terms and abbreviations is provided herewith as Appendix A.

BACKGROUND OF THE INVENTION

The present invention relates to apparatuses and methods for implementing mobile communication. More particularly, the present invention relates to a novel cellular adjunct system that advantageously offers cellular-like service to regions in need of an inexpensive and easily implementable mobile communication solution without incurring the expenses of implementing a full-featured, standard cellular system.

Mobile communication is known in the art. One limited form of mobile communication involves prior art cordless phones. In the prior art cordless phone system, each cordless phone set typically comprises a base unit and a cordless unit. The base unit, typically located inside a residence or a business office, is usually coupled physically by copper wires or fiber optics to the public switched telephone network (PSTN). To uniquely identifies it in the public network, each cordless phone set is specifically associated with a telephone number.

Further, each cordless phone's base unit is specifically associated with its cordless unit and communicates therewith in a wireless manner. As long as a user of the prior art cordless unit stays within the limited range of the associated base unit (under a quarter mile in most cases due to technical limitations inherent in cordless technology), calls may be made to and from the public network in a wireless manner.

However, the prior art cordless phone has some significant disadvantages. Besides the limited range, the prior art cordless technology is limited in the number of cordless units that a base unit can support. Typically one, no more than two, handset is provided per base unit in the prior art cordless phone. Because of this limitation, a telephone service provider must still run wires, either along telephone poles or in trenches, to each residence or business to enable telephone service, whether or not cordless. Therefore, although the cordless unit appears mobile to the user, the network that is required to implement this service is still essentially a wired telephone network.

Users' demand for mobile communication services, as well as the increasing costs of building and maintaining a wired telephone infrastructure, has turned many service providers to other wireless technologies for answers. Among existing technologies, cellular technology has emerged the clear leader in term of market penetration. In particular, cellular phone systems using a standard known as Global Systems for Mobile Communication (GSM) has steadily gained popularity among service providers as the system of choice for implementing cellular service. The popularity of the GSM standard stems from its robustness and its ability to support a rich set of features such as world-wide roaming, phone mail, data services, supplemental services, and the like. Information regarding the GSM standard is widely available in the public domain, some of which are cited in Appendix B herein.

However, the implementation of a GSM cellular network, or any cellular network for that matter, is still a relatively costly undertaking for many communities. Although there is disclosed in the aforementioned co-pending patent application Ser. No. 08/435,709 methods and apparatuses for implementing cost-effective cellular systems, it has been recognized that certain communities, particular those in the growing or remote regions of the world, do not require the extensive set of features offered by a standard cellular network, such as one that implements the GSM standard. Examples of such communities include islands, manufacturing facilities in remote regions, and remote villages. As it stands, these communities must choose between either traditional wired networks, which require extensive physical infrastructures to implement, or standardized cellular systems such as existing GSM cellular systems, which offer many non-essential features that make them too costly to be practical for these communities.

For these communities, what is desirable is a novel cellular adjunct system (CAS) that offers the advantages associated with cellular services, such as the elimination of an extensive wired network, handset mobility, and the like, without incurring the full cost of implementing a standardized cellular network, which has features such as world-wide roaming or data transfer that may be neither practical nor necessary. It is essential, however, that the cellular adjunct system work seamlessly with any existing wired PSFN network. Further, because some of these communities may already have some existing form of central office switches (CO), it is important that any communication system implemented therein must integrate with the existing CO's to allow these communities to leverage their investment in existing CO's hardware, software, and other telephone infrastructures already in place.

Further, it is desirable that such a novel cellular adjunct system provides substantially seamless call routing and subscriber information management between the wired phones of the public network and the mobile handsets of the novel cellular adjunct network. To further reduce operational overhead, it is preferable that subscriber and billing data of the novel cellular adjunct be centrally managed by the same central public subscriber management system that handles the subscriber and billing data of existing wired phone users.

It is also recognized that additional cost savings may be realized by using widely available and proven cellular components, such as GSM handsets, GSM base transceiver station and base station receiver hardware, in the implementation of the aforementioned novel cellular adjunct system. This is so even though the novel cellular adjunct system derives its cost savings by substantially avoiding the costly implementation of the full GSM feature set.

The use of proven, off-the-shelf GSM components would not only reduce the expenses associated with developing and testing new hardware but also render the novel cellular adjunct system easily upgradable to a full-featured cellular network such as a GSM network. For example, when the community evolves and the need for a fuller set of cellular features arises, the novel cellular adjunct system may be upgraded to a full-featured GSM cellular network without requiring users to change handsets or requiring a major reconfiguration of the network hardware.

These and other highly desirable features that overcome the disadvantages associated with traditional cordless phone systems as well as full-featured cellular systems are realized by the novel cellular adjunct system, which is described in details in the text of this specification and its drawings.

SUMMARY OF THE INVENTION

The present inventive cellular adjunct system represents a highly efficient way to provide a wireless solution for a wired network without incurring the full costs and complexities associated with implementing a full-featured cellular system.

The present invention relates, in one embodiment, to a cellular adjunct system for extending telephone service offered by a public wired telephone network, which has wired telephone sets, to a plurality of cellular handsets. The public wired telephone network includes an operation and maintenance center for managing subscriber data related to both the wired telephone sets and the plurality of cellular handsets.

The cellular adjunct system, which facilitates cellular communication among the plurality of cellular handsets and between the plurality of cellular handsets and the wired telephone sets, includes a base station subsystem and a cellular adjunct control block. The base station subsystem includes radio resource management facilities for permitting the plurality of cellular handsets to communicate with the base station subsystem in a cellular manner. The cellular adjunct control block, which is coupled between the base station subsystem and switching networks in the public wired telephone network, includes a registry, a mobile switching center, and a mini-central office.

The registry contains routing data related to the plurality of cellular handsets to facilitate routing calls thereto, the routing data including data indicating whether a particular cellular handset in the plurality of cellular handsets is available for receiving a call. The mobile switching center is coupled to the registry and facilitates switching of calls among the plurality of cellular handsets.

The mini-central office is coupled to the registry and the mobile switching center and ascertains whether signaling data from a first cellular handset of the cellular handsets relates to an internal call or an external call. The internal call represents a call between the first cellular handset and a second cellular handset of the plurality of cellular handsets. The external call represents a call between the first cellular handset and one of the wired telephone sets in the public wired telephone network. The signaling data is forwarded to the mobile switching center for switching the internal call if the signaling data relates to the internal call. On the other hand, the signaling data is forwarded to the public wired telephone network for switching the external call if the signaling data relates to the external call.

In one embodiment, the plurality of cellular handsets represent standard GSM handsets, thereby simplifying future upgrades of the inventive cellular adjunct system to a full cellular communication system. In another embodiment, the mobility management facility confines each of the plurality of handsets to its own base transmitter station home location area, thereby simplifying the implementation of cellular communication to and from the plurality of cellular handsets in the inventive cellular adjunct system.

These and other features of the present invention will be presented in more detail in the following specification of the invention, the figures, and the appended claims.

BRIEF DESCRIPTION OF THE DRAWINGS

Additional advantages of the invention will become apparent upon reading the following detailed description and upon reference to the drawings, in which:

FIG. 3 shows a representative cellular adjunct system (CAS) subscriber database;

DESCRIPTION OF THE PREFERRED EMBODIMENT

Figure 1:
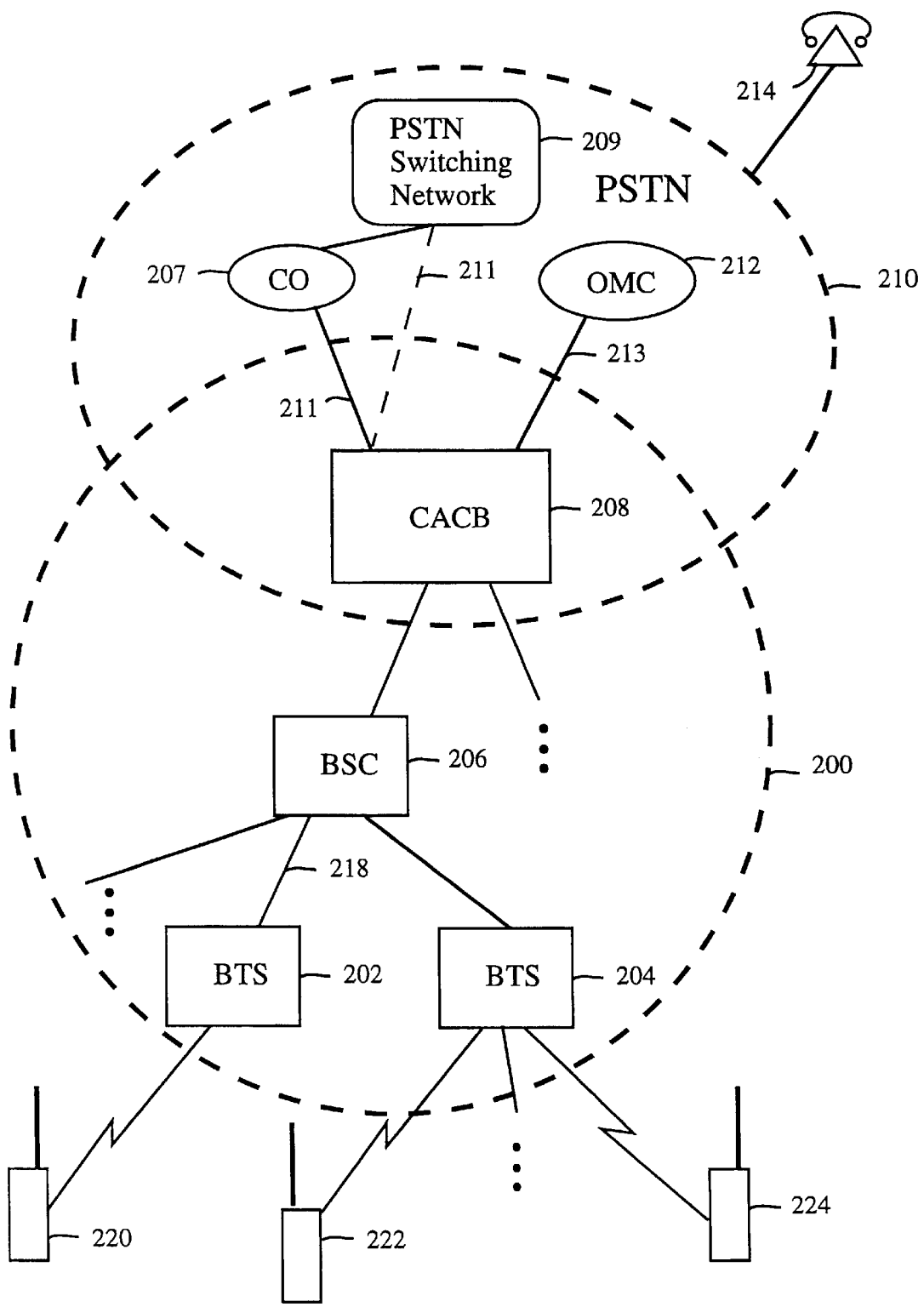
FIG. 1 shows, in one embodiment, a representative cellular adjunct system (CAS)

FIG. 1 shows, in one embodiment, a representative cellular adjunct system (CAS). In FIG. 1, there is shown a CAS 200, which includes a plurality of base transceiver stations (BTS's) 202 and 204, a base station controller (BSC) 206, and a cellular adjunct control block (CACB) 208. With respect to hardware, BSC 206 and BTS's 202 and 204 are substantially identical to the respective BSC and BTS's discussed in the aforementioned co-pending patent application Ser. No. 08/435,709. The BSC's and the BTS's of the CAS form a base station subsystem (BSS). In one embodiment, the BSC and BTS's of FIG. 1 implements the aforementioned GSM standard. Further, the GSM standard is discussed throughout this specification for ease of illustration. However, the present inventive CAS is not limited to any particular standard, and it should be within the abilities of one skilled in the art to modify the CAS disclosed herein to implement any of a number of widely available standards.

It should be kept in mind that the CAS of FIG. 1 is only representative. A greater or fewer number of BTS's may be provided per BSC 206 while any number of BSC's may be provided per cellular adjunct control block (CACB) 208. In one embodiment, each base station subsystem (BSS) has radio resource management facilities for handling a finite number of mobile stations (MS units), or cellular handsets. BTS 202 is shown to be in radio contact with MS unit 220 and consequently provides radio-related resources for handling cellular communication to and from MS unit 220. Similarly, BTS 204 provides radio-related resources for handling cellular communication to and from MS units 222 and 224.

The mobile stations managed by CAS 200, e.g., MS units 220, 222, and 224, preferably represent standard cellular handsets. In one embodiment, they represent off-the-shelf GSM cellular handsets. The use of standardized handsets advantageously permits the service provider, i.e., those who implement and/or manage CAS 200, to update at a later date CAS 200 to a standard full-featured cellular system without requiring owners of existing MS units 220, 222, and 224 to replace their handsets by purchasing new ones. Likewise, the use of standard cellular hardware for BSC 206 and BTS's 202 and 204 facilitates easy upgrade to a standard full-featured cellular system at a later date. If the BSC's and the BTS's of co-pending patent applications Ser. No. 08/435,709 and Ser. No. 08/435,838, as well as the aforementioned copending patent WAVEP005, are used, upgrading may, in one embodiment, simply be a matter of loading new software into the BSC and BTS chassis.

The use of standard cellular technology for implementing the inventive cellular adjunct system advantageously allows the CAS network to handle thousands of MS units per CAS. This is particular true in the GSM embodiment since the GSM specification is well-adapted to support a large number of MS units. Furthermore, each MS unit, being a standard GSM handset in one embodiment, may have a range as great as over 20 kilometers or as little as a few hundred meters. These enhanced capabilities represent a clear advantage over the range and capacity limitations of the prior art cordless phone systems. When the range is at its lower end, the novel CAS advantageously provides the ability to restrict the roaming area of a given handset to a very small area. Additionally, if the range is at its lower end, as is the case in one embodiment, transmission power may be reduced, thereby providing additional cost savings over traditional, full-featured cellular systems that typically provide a much greater range.

Additionally, the components of CAS 200, such as its BSC's and BTS's may be strategically located in a geographic area to shape the domain of the CAS network coverage area. This is especially true when low-power, microcell components, such as those disclosed in the aforementioned patent applications Ser. No. 08/435,709 and Ser. No. 08/435,838, are used. When changes have to be made, e.g., when a manufacturing plant moves its location, only a few units must be physically moved. In contrast, wired phone systems for implementing the prior art cordless phones requires major physical changes to the wired network for such changes.

CACB 208 communicates with a public network 210, which represents the public switched telephone network (PSTN) in one embodiment, through link 211. Link 211 is preferably through a SS7 signaling link although other types of signaling links such as R2 or ISDN signaling may also be used. Link 211 is used for coupling CACB 208 to a PSTN switching resources. In one embodiment, the PSFN switching resources represent the switching network (209) of the wired telephone network. In another embodiment, the PSTN switching resource may be an existing central office (CO 207). From the public network perspective, CACB 208 is an integral part of the public network, serving as a gateway to the CAS's MS units. In fact, the CAS network behaves, from the perspective of the public network, as if it is an extension of the wired central office (CO). The extension allows the service provider to offer telephone service to areas where CO implementation may not be practical, e.g., due to economic or geographic factors, and to provide cellular telephone access. The fact that communication between the BTS's of the CAS and its MS units is accomplished in cellular manner is largely transparent to the rest of the public network.

There is further shown in FIG. 1 an operation and maintenance center (OMC) 212 associated with public network 210. OMC 212 in public network 210 communicates with CACB 208 via a link 213, which uses an X.25 protocol in one embodiment. In some embodiments, other protocols such as TCP/IP, ATM, and the like, may be used. In a typical PSTN network, OMC 212 typically includes a set of applications for managing subscriber-related data such as subscriber information, billing, network maintenance, and the like. In the typical PSTN network configuration, i.e., one unattached to the inventive CAS system of FIG. 1, OMC 212 manages only the subscriber data related to the wired phone customers. Cellular subscribers who utilizes prior art cellular networks typically have their subscriber data handled by a different subscriber management system, i.e., one specifically associated with the cellular system. For this reason, bills from the PSTN provider and the cellular provider are typically handled separately in the prior art.

In the inventive CAS system of FIG. 1, OMC 212 of public network 210 also provides subscriber data management for the CAS customers. By way of example, when a CAS potential customer wants to activate service for a MS unit 224, subscriber information such as billing address, billing information, the type of service chosen, the telephone number associated with MS unit 224 is kept track of by OMC 212. As will be shown later, a subset of the subscriber information also resides in a home location registry (not shown in FIG. 1) in CACB 208 to facilitate call routing. In one embodiment, CACB 208 keeps track of phone usage by its MS units and supplies that information to the public network 210 which, through OMC 212, administers any charge for usage of the CAS network 200. Since both the subscriber data and the billing service are managed by the public network, these tasks are advantageously offloaded from CAS administrators, which in turn advantageously reduces the operational overhead associated with providing cellular service to CAS customers.

In FIG. 1, the connection from CACB 208 to public network 210 is typically a wired connection. For certain configurations, however, the connection may be made wireless, e.g., by a microwave link. This is especially advantageous in situations where CAS's are deployed in widely dispersed and remote environment. In this case, the use of a microwave link may provide substantial savings since it obviates the expenses associated with laying wires over long distances. The connection between CACB 208 and BSC 206 is typically a wired connection, as is the connection between a BSC and its BTS's. The cellular portion of the CAS system exists between the BTS, e.g., BTS 202 or BTS 204, and the MS units since infrastructures to handle the MS units in a wireless manner exist in the BTS's 202 and 204, and to a certain extent, in BSC 206. To the public wired telephone network, however, the fact that the MS units communicate with the BSS in a cellular manner is essentially transparent.

For calls between MS unit 222 and MS unit 224, i.e., calls made locally within the CAS system 200, the bearer data channels connection cross-connect can be made at the CACB 208 level, and more particularly, within a mobile switching station (MSC), which is provided in CACB 208. For further details regarding one implementation of the MSC, reference may be made to the aforementioned patent application Ser. No. 08/435,709. However, as disclosed in the aforementioned co-pending patent Ser. No. 08/435,838, the connection cross connect may be made at lower levels in the network hierarchy, such as at BSC 206, or at BTS 204.

FIG. 1 also shows a wired phone 214, which is coupled to public wired telephone network 210 in a conventional manner. Wired phone 214 is not considered part of CAS network 200. When wired phone 214 wishes to establish a call with one of the MS units within CAS network 200, say MS unit 222, the public network routes the call between wired phone 214 and MS unit 222 by routing between the two endpoints known to the public network, i.e., the CO in charge of wired telephone 214 and CACB 208. CACB 208 will consult its own database, known as a home location registry (CAS HLR) and finds the information to allow it to route the call to MS unit 222.

In the reverse direction, when MS unit 222 wants to call wired phone 214, MS unit 222 presents the telephone number of wired phone 214 to CACB 208. CACB 208 will, using for example a dial number tree, ascertain that the phone number sent by MS unit 222 is not one that is associated with one of the MS units in CAS 200. CACB 208 will request the public network to route the call between itself and the CO (not shown) associated with wired phone 214, thereby completing the call path.

If there is another CAS system connected to public network 210, a MS unit therein may dial and be connected to a MS unit within CAS 200 of FIG. 1 in a manner that is totally transparent to both public network 210 and the origination CAS system. The fact that the call is now MS unit to MS unit is transparent because the public network simply routes the call between two known endpoints, whether each is a CACB, a CO, or the like.

Figure 2:
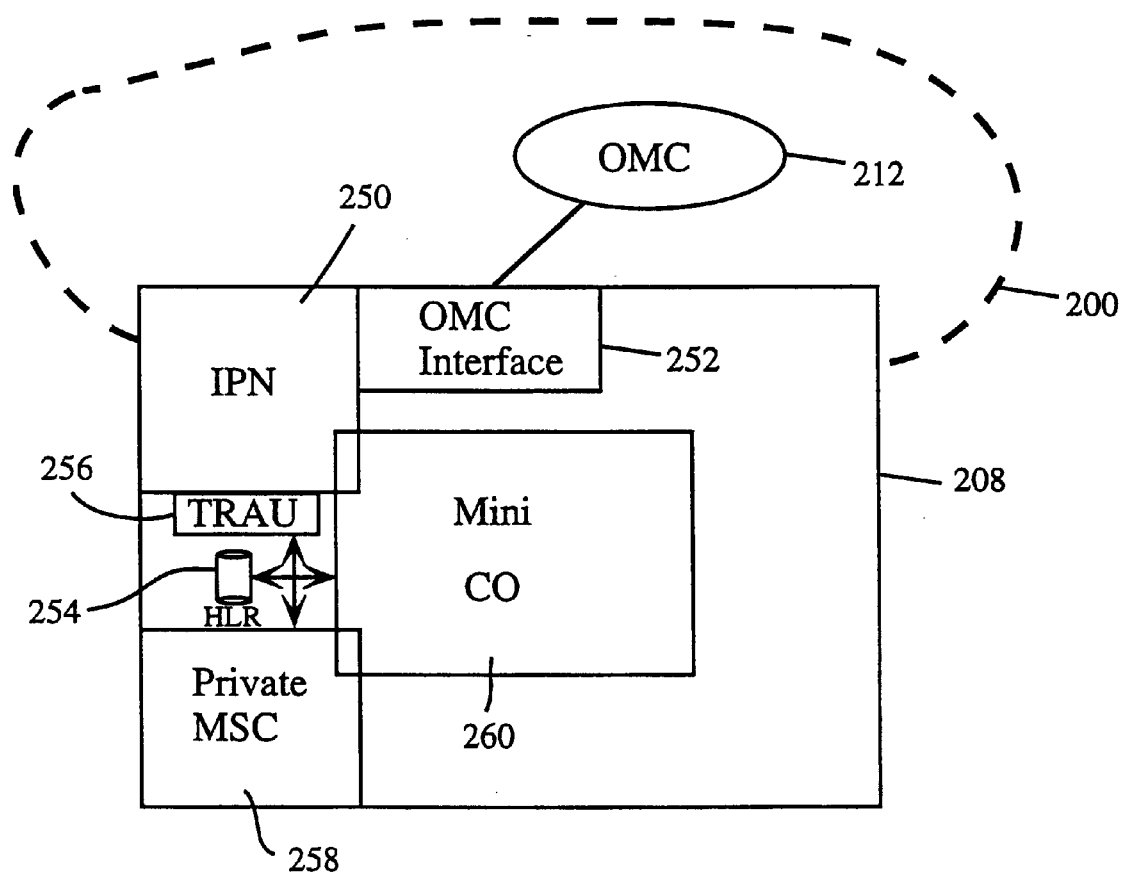
FIG. 2 illustrates the major functional blocks of the cellular adjunct control block (CACB) 208 of FIG. 1.

FIG. 2 illustrates the major functional blocks of CACB 208 of FIG. 1. Within CACB 208, there is provided an internal interface to public network (IPN) 250. The interface is internal since, as mentioned earlier, the CAS is considered an integral part of the public network. IPN 250 facilitates communication with the public network, which communication utilizes the SS7 signaling in one embodiment. FIG. 2 further shows in CACB 208 a home location registry (CAS HLR) 254 for storing subscriber data relating to the CAS customers.

In one embodiment, there is no provision in a CAS network for roaming outside of the CAS domain. To further reduce implementation cost, there is in another embodiment (basic CAS configuration) no roaming among the BTS's of the CAS network. Consequently, each subscriber in the CAS network is considered to have fixed home location, which is limited to a BTS domain in the basic CAS configuration, or may be expanded to include a number of BTS's, the domain of a BSC, the domain of a set of BSC's, or even the domain the entire CAS network in enhanced configurations. Further, it is possible, in one embodiment, to provide for full international roaming, e.g., by implementing a full-featured MSC in CACB 208. Note that even in its most restricted form, there is still a considerable degree of mobility within the BTS domain.

The information regarding a subscriber's home location is entered into the central public subscriber management system in the public network, and provided to CAS HLR 254 via OMC 212 and an OMC interface block 252. CAS HLR 254 also gets updated similarly when a subscriber gets removed or when a subscriber service is updated in the public network subscriber management system. OMC interface block 252 facilitates communication between CACB 208, particularly a CAS HLR 254 therein, with OMC 212. In one embodiment, OMC interface 252 implements an X.25 protocol for communication between CACB 208 and OMC 212.

Note that CAS HLR 254 does not need to know, in one embodiment, all the subscriber information in the public subscriber management system of the public network to enable CACB 208 to perform its routing function. It is contemplated that, in one embodiment, only routing data is required in the CAS HLR 254. In another embodiment, the only information required is that which is necessary for authenticating whether a given MS unit is authorized to use the resources of the CAS system to make and receive calls. Consequently, only a small subset of the subscriber information in the public subscriber management system of the public network needs to reside in CAS HLR 254. In yet another embodiment, however, CAS HLR 254 may have all the subscriber data relating to CAS customers.

FIG. 2 also shows a TRAU block 256. Note that TRAU block 256 is located adjacent to IPN 250 and away from its prior art position, which is on the mobile station side of the private mobile switching center (MSC) 258. Private MSC 258 stays substantially the same as the private MSC disclosed in the aforementioned co-pending patent application Ser. No. 08/435,709. In one embodiment, there is only one private MSC 258 per CAS system. The fact that TRAU is not automatically provided for calls which are strictly internal to the CAS network, i.e., between two MS units of the CAS network, provides advantages which are discussed extensively both co-pending patent applications Ser. No. 08/435,709 and Ser. No. 08/435,838.

There is further optionally provided a mini CO 260 whose main job is to control the switching between calls that either originates from or terminates at one of the MS units of the CAS system. Further information regarding the mini CO may be made in reference to the aforementioned co-pending patent application, in particular element PBX 256 of FIGS. 3B, 4B, 5B, 6B therein and their associated text. In one embodiment, no mini CO 260 is provided. In that case, the CAS network simply provides call connectivity to the public network, via IPN 250, where call switching actually takes place. Private MSC 258 still handles location update requests and other optional supplemental services. Without having to provide a mini CO, this CAS configuration represents an inexpensive way to provide cellular-like service as an adjunct to existing wired public network.

If the CACB is connected to a CO within the PSTN, this CO can be used to switch calls to and from MS units of the CAS network. Advantageously, the CO does not even have to be a cellular or GSM CO. In fact, it is contemplated that wired CO's, such as AMPS, POTS, TABS, analog CO's, or the like may be used. When such a non-GSM CO is used, communication between that CO and the CAS may take place through a proper interface, which may be a DSO interface in one embodiment. This is in contrast to prior art cellular systems which require a cellular CO, e.g., a GSM CO.

The ability to use a mini CO to implement switching within the CACB allows more flexibility in the implementation of the CAS system and may result in substantial savings. This feature is especially advantageous for markets like small island nations where the public network central office may be hundreds of miles away from the villages where the CAS network is implemented. Using a mini CO permits local calls, i.e., calls between MS units of the CAS network, to be switched locally, thereby alleviating the bottleneck that is present when all calls must be backhauled long distance back to the public network CO for switching. To further reduce the expenses associated with implenting the CAS system, the coupling between the CAS CACB and the switching resources of the public wired network may be accomplished using a wireless link such as a microwave link.

Regardless whether switching is done at the CAS site or back at the public network CO, however, it is preferable in one embodiment that administration of subscriber and billing tasks be centralized so as to relieve the CAS administrator of the expenses associated with maintaining a subscriber and/or billing database. This feature advantageously enables a service provider to have an inexpensive entry into the mobile communication market and introduce users to inexpensive cellular-like service, which can be easily and inexpensively updated to full-featured cellular service in the future.

In FIG. 2, it is assumed for the purpose of discussion that a mini-mini CO is provided. Mini CO 260 keeps track of the dial number tree in order to perform call switching and also communicates with CAS HLR 254 to authenticate and validate whether a certain MS unit can perform certain supplemental services such as call forwarding, conference calls, and the like.

FIG. 3 shows a representative simple CAS subscriber database, which resides on CAS HLR 254. It should be kept in mind that the CAS subscriber database shown in FIG. 3 is only representative and variations may exist Within the CAS subscriber database, there exists routing data for the MS units. Field 270 contains the IMSI of the MS units of the CAS network. Field 272 contains the phone number associated with the IMSI in field 270. Field 274 contains the home location of the MS unit whose IMSI is shown in field 270. In one embodiment of the basic CAS configuration, there is no roaming among BTS's and consequently, the home location may be narrowed down to a specific BTS. However, a given MS unit may be allowed to reside in multiple BTS's location areas. When multiple BTS location areas are listed in field 274 for a given MS unit, that MS unit may roam among those multiple BTS location areas and may still be considered in range. Field 276 indicates the status of the MS unit whose IMSI is shown in field 270. Statuses of an MS unit may include flags to indicate whether the MS unit is within the home location indicated in field 274, whether the MS unit is turned on and has checked in timely, and the like. In field 278, there optionally exists a list of supplemental services subscribed to by the MS unit associated with the IMSI list in field 270. Note that the supplemental services are not offered for all CAS configurations, and the omission of these services may, in some cases, advantageously facilitates lower entry cost for service providers who wish to offer cellular-like service as an adjunct to a public wired telephone network.

Figure 4:
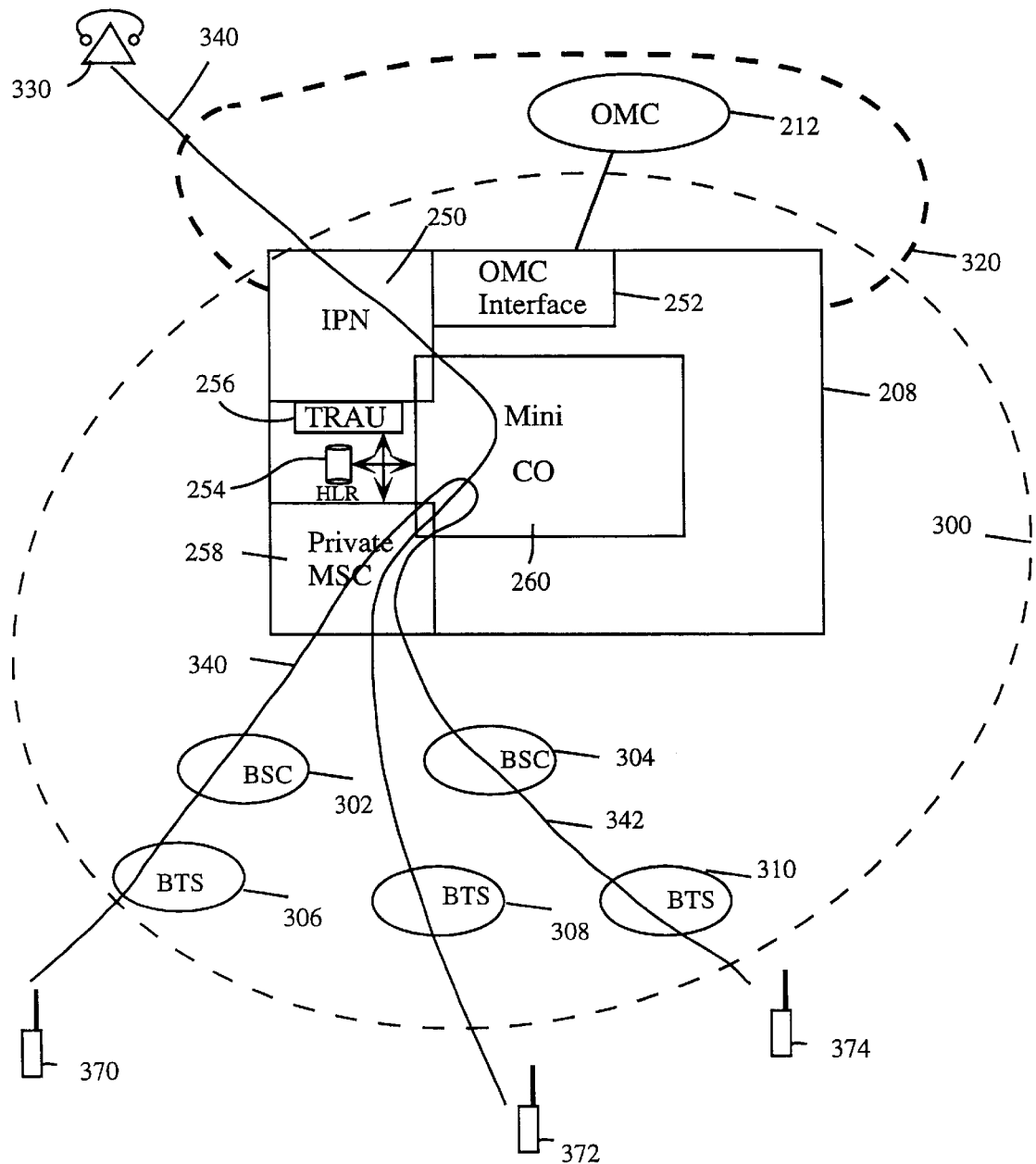
FIG. 4 illustrates a cellular adjunct system (CAS), including its cellular adjunct control block (CACB) and the call paths made when routing calls.

FIG. 4 illustrates CAS network 300 including CACB 208, BSC's 302 and 304, and BTS's 306, 308 and 310. In the example of FIG. 4, BTS 306 is controlled by BSC 202 while BTS's 308 and 310 are controlled by BSC 304. Of course, a greater or fewer number of BSC's and BTS's may be provided depending on CAS network capacity and domain requirements. MS unit 370 is controlled by BTS 306, MS unit 372 is controlled by BTS 308, and MS unit 374 is controlled by BTS 310.

FIG. 4 further shows a public wired network 320 coupled to CACB 208 of CAS network 300. A wired phone set 330 is coupled to public wired network 320 in a conventional manner.

To illustrate the operation of CAS network 300, FIG. 4 further shows a plurality of call paths 340 and 342. When an MS unit 372 wishes to make a call to wired phone set 330, which is outside of CAS network 300, i.e., an external call, MS unit 372 requests a connection that connects it to private MSC 258. In its request, MS unit 372 provides an initial address message (IAM) to private MSC 258. The signaling data received by private MSC 258 is then forwarded to mini CO 260. Mini CO 260, by going through the dial number tree, will realize that the phone number dialed does not belong to one of the MS units in CAS network 300. Consequently, mini CO 260 will forward the received IAM to internal interface to public network (IPN) 250. Through its signaling link, IPN 250 sends the IAM to public wired network 320, where the call is eventually routed to wired phone set 330 in a conventional manner.

In the reverse direction, when wired phone set 330 wishes to call an MS unit within CAS network 300, it will send its dialed number to public wired network 320. Based on the number dialed by wired telephone 330, public wired network 320 will find the mini CO 260 in, say, the first six digits of the 10-digit telephone number dialed. In this case, the mini CO 260 is the one associated with CACB 208. Mini CO 260 in CACB 208 will receive the IAM, consults with CAS HLR 254 to ascertain the MS unit associated with the telephone number dialed (which is contained in the IAM). Mini CO 260 also ascertains in the database of CAS HLR 254 whether the status of the MS unit associated with the telephone number dialed indicates whether it is available for taking the incoming call or whether it is busy with another call.

If the destination MS unit is in the appropriate home location area (which is defined in the database of CAS HLR 254) but busy, mini CO 260 preferably returns a busy indication to the calling CO in the public wired network. On the other hand, if the status of the destination MS unit indicates that it is not turned on or if the MS does not respond to its page, a ringing indication, e.g., an alert message, will be sent back to the calling CO in the public network. The calling CO may then appropriately notify the calling phone regarding the status of the destination MS unit. The status of the destination MS unit may indicate that it is not turned on or has not checked in timely when it, for example, roams out of its allowed home location area (which may be as narrow as a single BTS in the basic CAS configuration or as wide as the entire CAS network in the enhanced configuration). If, however, the destination MS unit has been turned on and is not busy, when the user answers the call, the call will be terminated (connected) at the destination MS unit. The steps for call termination at an MS unit of the CAS network are shown later in FIGS. 9 and 11.

For calls that are strictly within CAS network 300, e.g., internal call, between MS units 370 and 374, the procedure is slightly different. Assuming for the moment that MS unit 370 is the calling MS unit and MS unit 374 is the destination MS unit. MS unit 370 would first request a connection that connects it to private MSC 258. MS unit 370 then provides an initial address message (IAM) to private MSC 258. The signaling data received by private MSC 258 from MS unit 370 is then forwarded to mini CO 260. The mini CO 260 will go through the dial number tree and realize that the destination telephone number belongs to one of the MS units in CAS network 300 (i.e., MS unit 374).

Mini CO 260 then consults with CAS HLR 254 to determine whether the destination MS unit, i.e., MS unit 374, is available to receive a call (i.e., has been turned on, checked in timely, and not busy). If MS unit 374 is available for receiving the phone call, mini CO 260 utilizes private MSC 258 to perform the connection cross connect between MS unit 370 and MS unit 374. The call path between MS unit 372 and MS unit 374 is shown as path 342 in FIG. 4. Note, however, that if intelligent switching is provided (as disclosed in co-pending patent application Ser. No. 08/435, 838), the connection cross connect between MS unit 370 and MS unit 374 may be made at a lower level in the network hierarchy, e.g., between BSC 302 and BSC 304. Further, unless MS units 370 and 374 communicate at different rate, rate conversion via TRAU is not necessary. In the present invention, TRAU is not automatically required since TRAU unit 256 has been moved from the BTS side of the MSC 258 to its public network side. This is unlike the situation in prior art cellular systems where calls between MS units are automatically TRAUed in the call path portion between the MS units and a prior art MSC.

Figure 5:
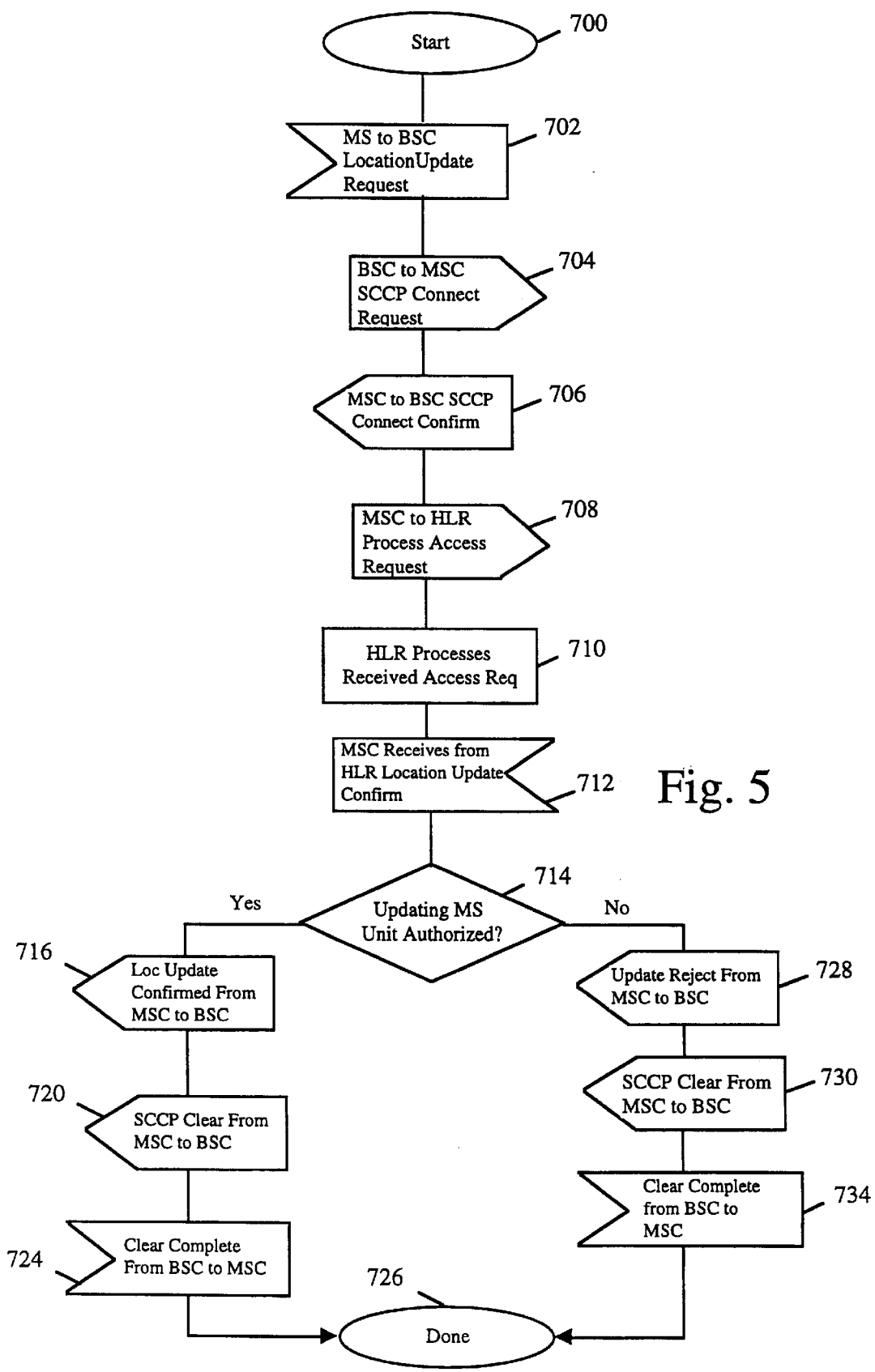
FIG. 5 shows in a flowchart format the steps involved when an MS unit wishes to update its location with a CAS HLR registry of a CAS network.

FIG. 5 shows in a simplified flowchart format the steps involved when an MS unit wishes to update its location with the CAS HLR registry of the CAS network. FIG. 5 starts at block 700. At block 702, an updating MS unit sends to a BSC subsystem via a BTS subsystem a location update request. Typically a location update request includes the IMSI of the updating MS unit. In one embodiment, the location update request may contain a version of the IMSI, known as a TMSI (temporary MSI that is used in place of the IMSI for, among others, security reasons). The identity of the MS unit, via either the IMSI or TMSI, uniquely identifies the MS unit that desires a location update.

At block 704, the BSC subsystem forwards to the MSC subsystem a SCCP connect request for the MS unit that sent the location update request in block 704. SCCP (Signaling Connection Control Part) connect request preferably represents, in one embodiment, a message conforming to signaling system 7 (SS7) or the A interface between the BSC and the private MSC function on the CACB. Typically, the SCCP connect request encapsulates the location update request sent by the updating MS unit in block 702. Block 702 and 704 builds the mobility management (MM) session.

In block 706, the MSC subsystem sends to the BSC subsystem a SCCP connect confirm to validate that an MM connection is established. Now from the perspective of the MSC, the MSC subsystem sends, in block 708, to the CAS HLR registry a process access request, which request includes the information contained in the location update request received at block 702, to ascertain via the CAS HLR registry whether the MS unit that is requesting the location update is "authorized", i.e., allowed to use the CAS network resources, and whether the updating MS unit has roamed away from its last location, necessitating an update in the CAS HLR registry. In the basic CAS configuration, a MS unit is only authorized to use the CAS network resources if it is located in the BTS location area assigned to it. In one enhanced embodiment, however, roaming among BTS's is enabled, and a given MS unit is deemed "authorized" to use any BTS of the CAS network as long as it is assigned to one of the BTS's.

In block 710, the CAS HLR registry processes the received access request which was sent in block 708. Block 710 is more fully explained in a subsequent FIG. 6. In block 712, the CAS HLR registry sends the MSC a location update confirm, indicating whether the updating MS unit is authorized to use the resources of the CAS network. If the updating MS unit is authorized to use the resources of the CAS network, the location update confirm preferably further includes information indicating whether a location update has been performed in the CAS HLR registry. In decision box 714, it is ascertained whether the updating MS unit is authorized (from the location update confirm received in block 712). If it is determined in block 714 that the updating MS unit is authorized to use the resources of the CAS network, the method proceeds to block 716 wherein a location update confirmed message is sent from the MSC to the BSC.

In block 720, the SCCP clear message is sent from the MSC subsystem to the BSC subsystem to clear the MM session built in block 702 and block 740. Subsequent to blocks 720, the BSC that receives the SCCP clear message in block 720 clears the channel all the way to the updating MS unit. In block 724, the BSC that receives the SCCP clear message in block 720 returns a clear complete message to the MSC, indicating that the MM session has been completely cleared. In block 726, the steps involved in updating location from an MS unit via an MSC is finished.

On the other hand, if it is ascertained in block 714 that the updating MS unit is not authorized to use the resources of the CAS network, the method immediately proceeds to block 728–734 to clear the SCCP or MM session. A MS unit may not be authorized if, for example, the CAS system is implemented as a basic configuration (i.e., no roaming among BTS's allowed), and that MS unit has been found in a BTS location area that is different from the one assigned to it. In block 728, the MSC subsystem sends to the BSC subsystem a location update reject message, indicating that the request to update location by the updating MS unit cannot be processed. In block 730, the MSC subsystem sends to the BSC subsystem an SCCP clear message to begin clearing the MM session. Subsequently, the BSC clears the channel all the way to the updating MS unit. In block 734, the BSC subsystem sends to the MSC subsystem a clear complete message, indicating that the MM session built in blocks 702 and 704 is cleared. Thereafter, the method proceeds to blocks 726 where the steps of FIG. 5 end.

Figure 6:
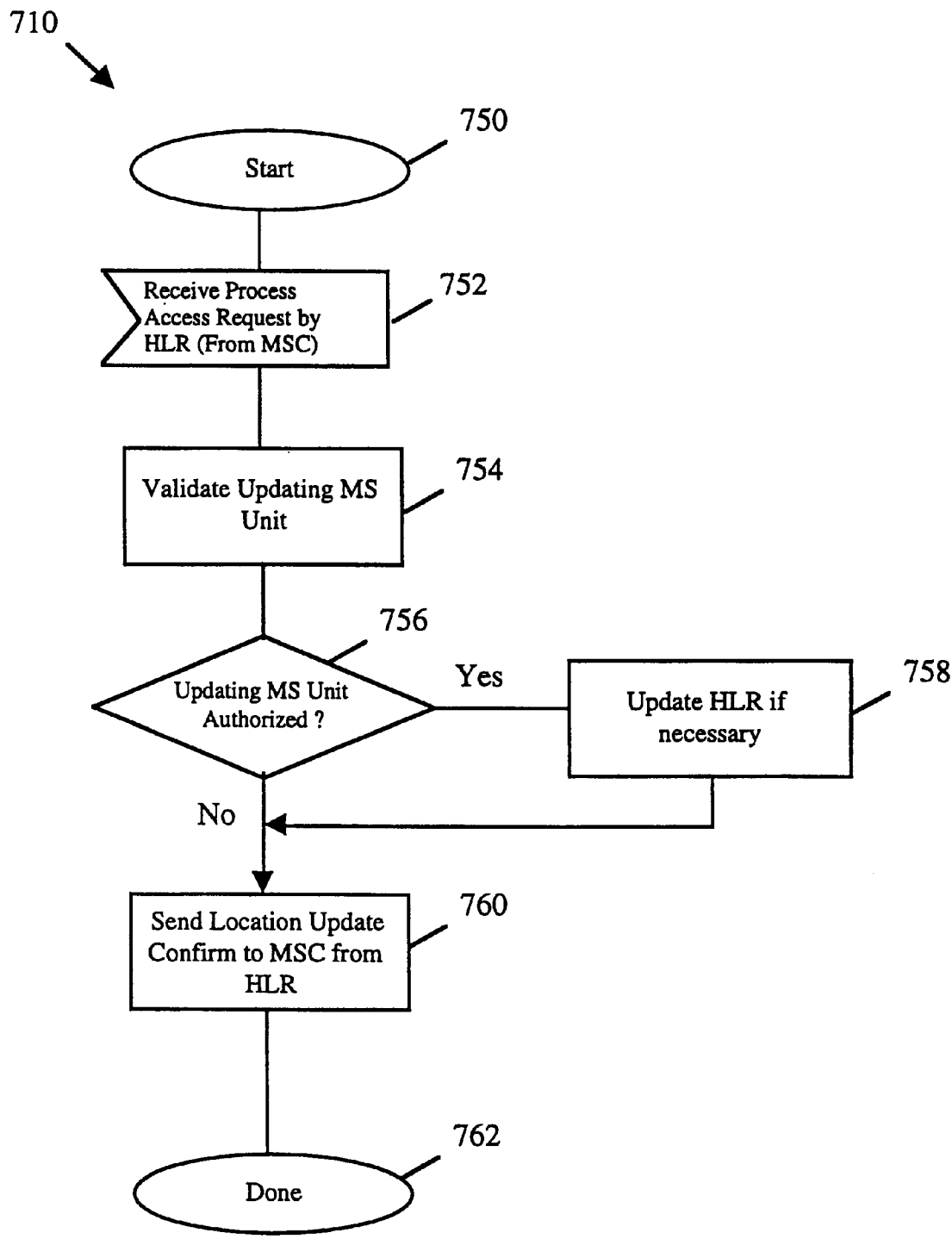
FIG. 6 shows in a flowchart format the steps involved when a CAS HLR registry processes a received access request.

FIG. 6 shows in a flowchart format the steps involved when the CAS HLR registry processes the received access request in block 710 of FIG. 5. FIG. 6 starts at block 750. From block 750, the method proceeds to block 752 wherein the process access request message sent by the MSC subsystem of block 708 of FIG. 5 is received. In accordance with one aspect of the present invention the IMSI associated with the updating MS unit is checked, in block 754, against all entries in the CAS HLR registry to determine whether the updating MS unit is authorized to use the resources of the CAS network. As mentioned earlier, a MS unit in the basic CAS configuration is only authorized to use the CAS network resources if it is located in the BTS location area assigned to it. In one enhanced embodiment, however, roaming among BTS's is enabled, and a given MS unit is deemed "authorized" to use the resources the CAS network as long as it is assigned to one of the BTS's. Advantageously, the validation procedure may be used to prevent a non-native MS units from using the resources of the CAS network.

Optionally, block 754 may further include certain security functions such as password checking, challenging, authenticating, or the like. If it is ascertained in block 756 that the updating MS unit is authorized the use of resources of the CAS network, the network proceeds to block 758 to update the CAS HLR registry if necessary. In block 758, the identity of the updating MS unit is checked to see whether its location needs to be updated in the CAS HLR registry that receives the process access request.

Following the update of CAS HLR registries in block 758 or if the updating MS unit is not authorized to use the resources of the CAS network (in some configurations and as determined in block 756), the method proceeds to block 760 wherein the CAS HLR registry sends a location update confirm to the MSC subsystem. As mentioned earlier in connection with block 712 of FIG. 5, the location update confirm sent in block 760 indicates whether the updating MS unit is authorized to use the resources of the CAS network and if it does, whether an update to the CAS HLR registry has been performed. In block 762, the step of FIG. 6 end.

Figure 7:
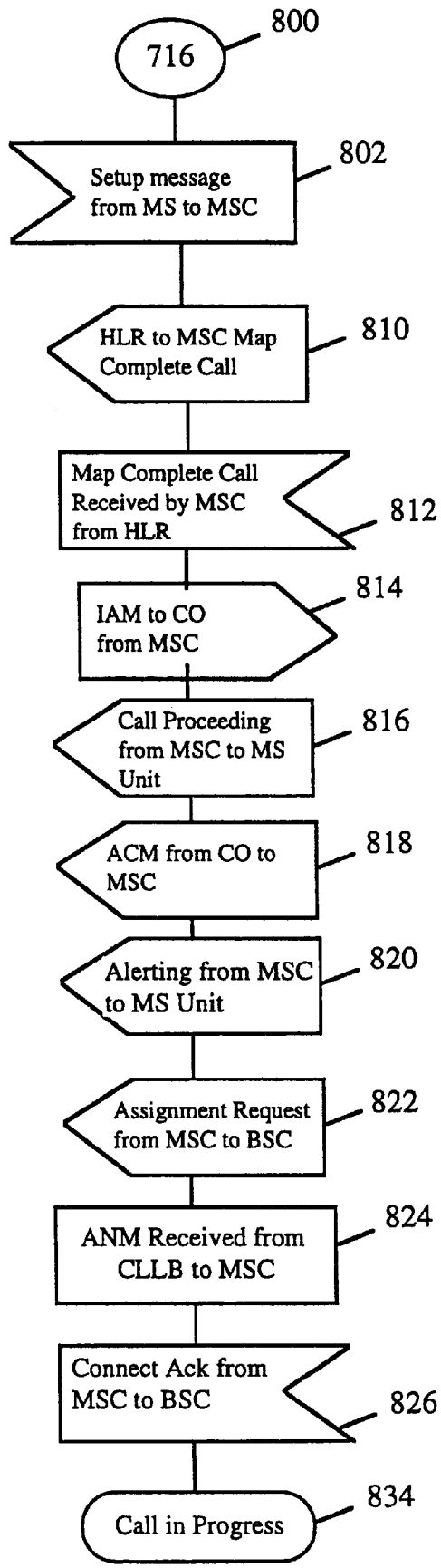
FIG. 7 shows in a flowchart format the steps taken by the various subsystems of a CAS network when an MS unit originates a call from inside a CAS network.

FIG. 7 shows in a flowchart format the steps taken by the various subsystems of the CAS network when an MS unit originates a call from inside the CAS network. The steps of FIG. 7 start where FIG. 5 (MS location update) leaves off following block 716. This is because it is still necessary for the MS unit to build the MM session (blocks 702 to 706), sends a process access request to the CAS HLR registry for processing (blocks 708–712), disabling the MS unit from using the resources of the CAS network if such usage is not authorized (blocks 714, 728, 730, and 734), and permits the call to proceed if the originating MS unit is authorized to use the resources of the CAS network (blocks 714, and 716).

Since the steps of FIG. 7 involves an MS unit making a call instead of merely requesting a location update (as is the case of FIG. 5), the message that piggybacks on the SCCP request of block 704 of FIG. 5 indicates to the MSC that a call and not a location update is being attempted. As is apparent to those skilled in the art, the calling MS unit may inform the CACB using any method of signaling that is convenient to implement. Further, since the steps of FIG. 7 is not a location update attempt, it is typically not necessary to update the CAS HLR registry regarding the location of the calling MS unit when a call is attempted. In the context of the present implementation, blocks 758 is not performed in one embodiment when an MS unit is building a call. In the particular implementation described herein, the method proceeds from block 756 to block 760 directly if it is ascertained that the calling MS unit is authorized to use the resources of the CAS network.

From block 800, the method proceeds to block 802 wherein the calling MS unit sends the MSC (via the BTS and BSC) a setup message which typically includes, among others, the destination phone number and information indicating whether the call to be built is voice, data, fax, and the like. The method then proceeds to block 810 where the CAS HLR registry sends a map complete call, which is a mobile-application-part type of message, to the MSC. The map complete call sent in block 810 is received by the MSC from the CAS HLR registry in block 812. In block 814 the MSC sends the mini CO an initial address message (LAM) which in the GSM implementation includes the destination phone number to indicate its desire to connect to a particular destination phone. If intelligent switching is involved, as is contemplated in one embodiment, it is the MSC in the CACB that decides the optimal cross-connect point, e.g., via BTS, BSC, MSC in the CACB or forwards the call to a public network.

In block 816 the MSC sends to the MS unit a call proceeding message responsive to a validation of the destination phone to indicate that the call is being processed. In block 818, an address complete message (ACM) is sent from the mini CO to the MSC to indicate that the entire destination number (the dialed number) has been received and that the call has been connected to its destination. The receipt of the ACM message by the MSC also signifies a successful alerting on the called party, i.e., the destination phone is ringing. In block 820, the MSC sends to the MS unit, responsive to the receipt of the ACM message received in block 818, an alerting message to the MS unit to inform the MS unit that the party called is being alerted and to turn on the ringer at the calling MS unit.

In block 822 the MSC sends the BSC an assignment request message to assign channel for the bearer, e.g., the actual voice/data, channel on the A interface and to instruct the BSC to use the assigned channel to build the call. The assigned channel represents the channel on which the calling MS unit may send and receive its bearer data. It should be noted that the steps in block 822 may occur asynchronously with respect to the other steps of FIG. 7. In one embodiment, the MSC sends the assignment request to the BSC right after the MSC sends to the mini CO the IAM message (block 814). After the alerting message is received by the MS unit, the ringer circuit at the calling MS unit continues to ring until either the called party picks up the call or the caller hangs up, in which case the MM session is again cleared in the manner earlier discussed.

In block 824, it is assumed that the called party picks up the call and the CACB sends an answer message (ANM) message to the MSC to indicate that the called party has answered the call by picking up. In block 826, the MSC sends to the BSC the connect acknowledged message, responsive to the receipt of the ANM message in block 824 to instruct the BSC to connect the received (incoming) path as well as the call (outgoing) path. In block 834 both the calling and the called party are connected all the way through and the call is now in progress.

Figure 8:
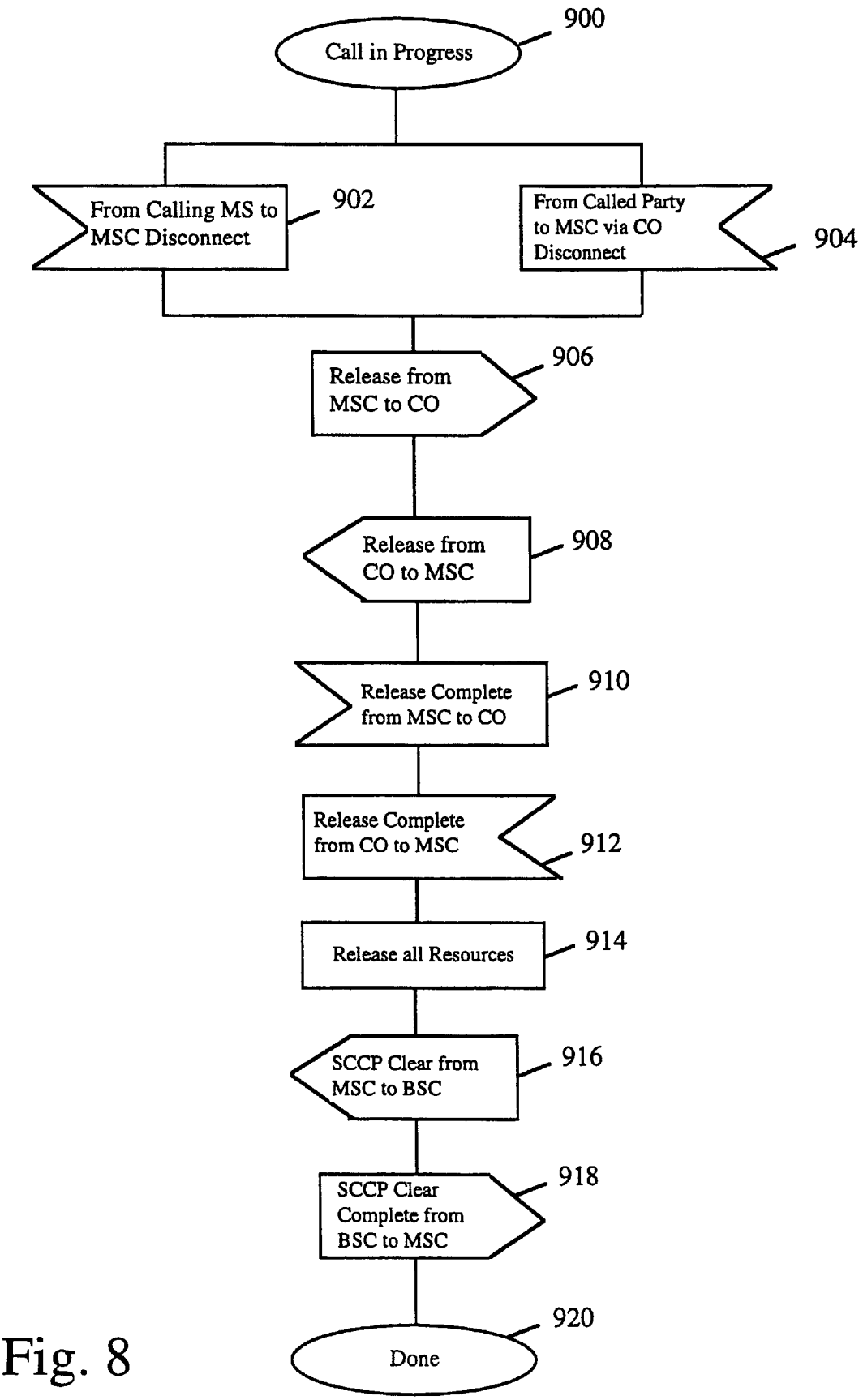
FIG. 8 shows in a format the steps taken by the various subsystems of the CAS network in disconnecting a call.

FIG. 8 shows in a flowchart format the steps taken by the various subsystems of the CAS network in disconnecting a call. A call is disconnected either because the calling party hangs up or the called party disconnects the call. It should be noted that, in one embodiment, the call may also be disconnected when an MS unit in the call path moves out of range of its assigned home location area. In the CAS basic configuration, the home location area is limited to the location area of the BTS to which the MS unit is assigned as its home location. In the enhanced CAS configurations, the home location area may include a number of BTS's, the domain of a BSC, the domain of a set of BSC's, or even the domain the entire CAS network in enhanced configurations. Further, it is possible, in one embodiment, to provide for full international roaming, e.g., by implementing a full-featured MSC in CACB 208.

The call is disconnected when either the calling party disconnects in block 902 or the called party disconnects in block 904. In block 902, the MSC receives from the calling MS unit a disconnect message, signifying that the calling party either has hung up or has roamed out of range. On the other hand, in block 904 the MSC receives from the called party via the mini CO a disconnect message, signifying that the called party either has hung up or has also moved out of range. In block 906 the MSC sends to the mini CO a release message to be forwarded to the called party responsive to the receipt of the disconnect message in either block 902 or block 904. The called party may be in the CAS network or in the public network, in which case the release message is forwarded via the internal interface to the public network (IPN). In block 908 the called party sends to the MSC via the mini CO a release message signifying the release authorization.

In blocks 910 and 912, release completion is acknowledged. In block 910 the mini CO receives from the MSC a release complete message responsive to the release message sent in block 908. Similarly, in block 912 the MSC receives from the mini CO the release complete message responsive to the release message sent in block 906. In block 914 all resources that are associated with the call being disconnected, e.g., TRAU, echo canceling, or the like, are released.

In block 916 and 918 the MSC clears the MM session all the way to the calling MS unit. In block 916, the MSC sends to the BSC a SCCP clear message to initiate clearing of the MM session. Thereafter, the BSC clears the MM session all the way to the calling MS unit. In block 918, the BSC sends back to the MSC an SCCP clear complete message indicating that the MM session has been cleared. In block 920, the steps of FIG. 8 end.

Figure 9:
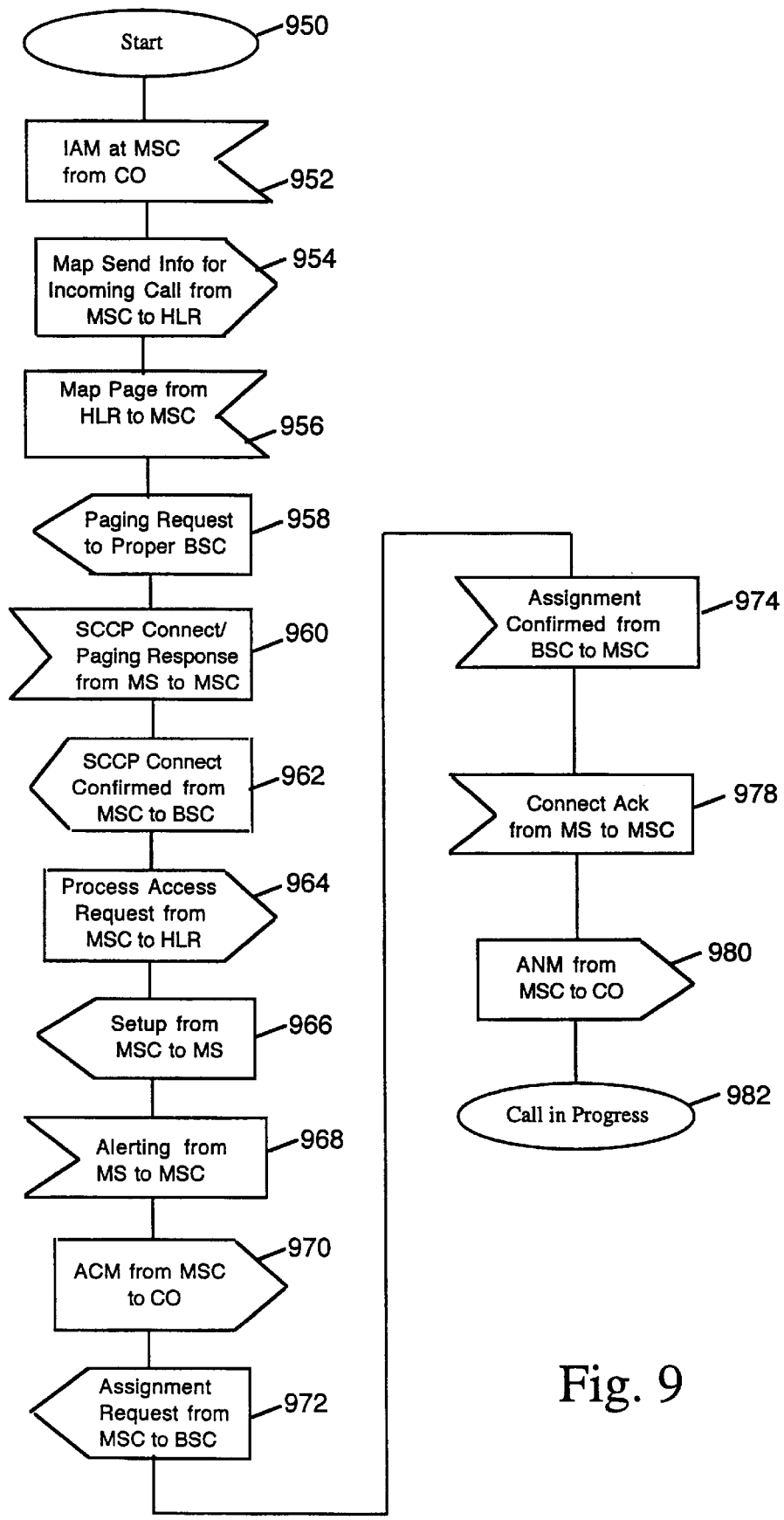
FIG. 9 shows in a flowchart format the steps involved when an MS unit of a CAS network acts as a receiving unit to receive a call initiated either from the public network or from another MS unit in the CAS network.

FIG. 9 shows in a flowchart format the steps involved when an MS unit of the CAS network acts as a receiving unit to receive a call initiated either from the public network or from another MS unit in the CAS network. FIG. 9 starts at block 950. In block 952, the MSC receives an initial address message (IAM) message from the network through the mini CO for a call that is terminating at an MS unit in the CAS network. If the calling unit is another MS unit in CAS network, the IAM message received in block 952 represents substantially the same IAM message sent by the calling MS unit in block 814 of FIG. 7.

In block 954, the MSC sends a map send information service request for the incoming call to the CAS HLR registry to locate the MS unit represented by the telephone number in the IAM message. In one embodiment, block 954 involves determining the current location of the destination MS unit in the CAS network (e.g., whether it has roamed away from its home location area if the configuration is enhanced), the IMSI number that corresponds to the telephone number received in the IAM message, the particular supplemental services subscribed to by the destination MS unit, and the like.

In block 956 the CAS HLR registry, after locating the current location area of the destination MS unit in block 954, sends a map page message to the MSC to request the MSC to page the destination MS unit by either its IMSI or some version thereof. In block 956, the map page message is sent to the MSC where the MS unit is currently located (as determined after consulting with the CAS HLR registry). In one embodiment, both map send information message and map page messages are representative of a type of mobile application part message.

In block 958, the MSC, responsive to receiving the map page message in block 956, sends to the proper BSC a paging request message. The receiving BSC's may be more than one BSC if the CAS HLR is uncertain regarding which BSC location area the destination MS unit is located. This is particularly true for the enhanced CAS configuration. The CAS HLR registry may, in one embodiment, know the exact BSC/BTS in which the destination MS unit is located (either through updates by the MS unit or because the MS unit is fixed to a particular BTS home location area). Responsive to the paging request, the BSC or BSC's page the destination MS unit and wait to hear the paging response from the destination MS unit.

In block 960, if the paging request sent in block 958 reaches the destination MS unit, the destination MS unit then sends a paging response to the BSC (via a BTS), which response is then encapsulated in a SCCP connect request that the BSC subsequently forwards to the private MSC. In one embodiment, if no paging response is received within a predetermined period, it is assumed that the destination MS unit has either roamed out of range or is turned off and the circuit connection is rejected.

In block 962, the MSC, responsive to receiving the SCCP connect message from the BSC in block 960, returns a SCCP connect confirmed message to the BSC. In this manner, the steps in blocks 960 and 962 build the mobility management (MM) session by associating the destination MS unit with a particular SCCP identifier.

In block 964, the destination MS unit that responded with a paging response (block 960) is then validated. The MSC sends to the CAS HLR registry a process access request service request to validate the responding destination MS unit. In block 964, the destination MS unit for which the paging request was sent (block 958) is further checked to see whether it is authorized or appropriate to establish bearer data communication channel to that destination MS unit. In one embodiment, the step of processing an access request from MSC to HLR of block 964 may involve exchanges of additional messages therebetween to, for example, perform authentication.

In block 966, the MSC sends a setup message to the destination MS unit to set up a call. The setup message contains the call control information, e.g., the type of services required (e.g., data/voice/fax) and optionally the calling party's phone number that is utilized for setting up the call. In block 967, the MSC sends to the mini CO an address complete message (ACM), signifying to the network that enough of the address (e.g., the dialed phone number) has been received to enable the CAS network to locate the destination MS unit. In block 968, the MSC receives from the destination MS unit an alerting message, indicating that the MS unit has acknowledged that a call that terminates on it has been attempted and that ringing may begin.

In block 970, the MSC sends an ACM message to the mini CO. It should be noted that although block 970 is shown after block 968 in FIG. 9, block 970 in fact occurs asynchronously with respect to the blocks of FIG. 9. By way of example, block 970 may occur as early as immediately following block 952.

In blocks 972 and 974, the bearer data channel resources between the MS unit and the MSC are assigned. In block 972, the MSC sends to the BSC (to be forwarded to the destination MS unit) an assignment request message to assign bearer data channel resources between the MSC and the BSC. The effect is to move the destination MS unit from a signaling only channel (which the MS unit has been on thus far in FIG. 9) to an assigned bearer data channel.

In block 974, the MSC receives from the BSC (which in turn receives from the destination MS unit) an assignment confirmed message, acknowledging the receipt and successful processing of the assignment request message sent by the MSC in block 972. In block 974, the MSC is notified that a successful bearer channel resource assignment, which enables bearer data communication, has been made. In one aspect of the present invention, blocks 972 and 974 involve intelligent cross-connect that delegates the actual cross-connect between the incoming path and the outgoing path for calls between two MS units of the CAS network to a lower level in the hierarchy. For further information regarding the intelligent cross-connect aspect, reference may be made to the aforementioned patent application Ser. No. 08/435,838.

In block 978, the MSC receives from the destination MS unit a connect acknowledge message, indicating that the destination MS unit is picked up. Responsive to the received connect acknowledge message in block 978, the MSC sends to the mini CO a answer message (ANM) in block 980 to indicate to the calling unit (which may be in the public network or another MS unit in the CAS network) that the destination MS unit has answered by picking up the call. In block 982, the call is now in progress.

Figure 10A:
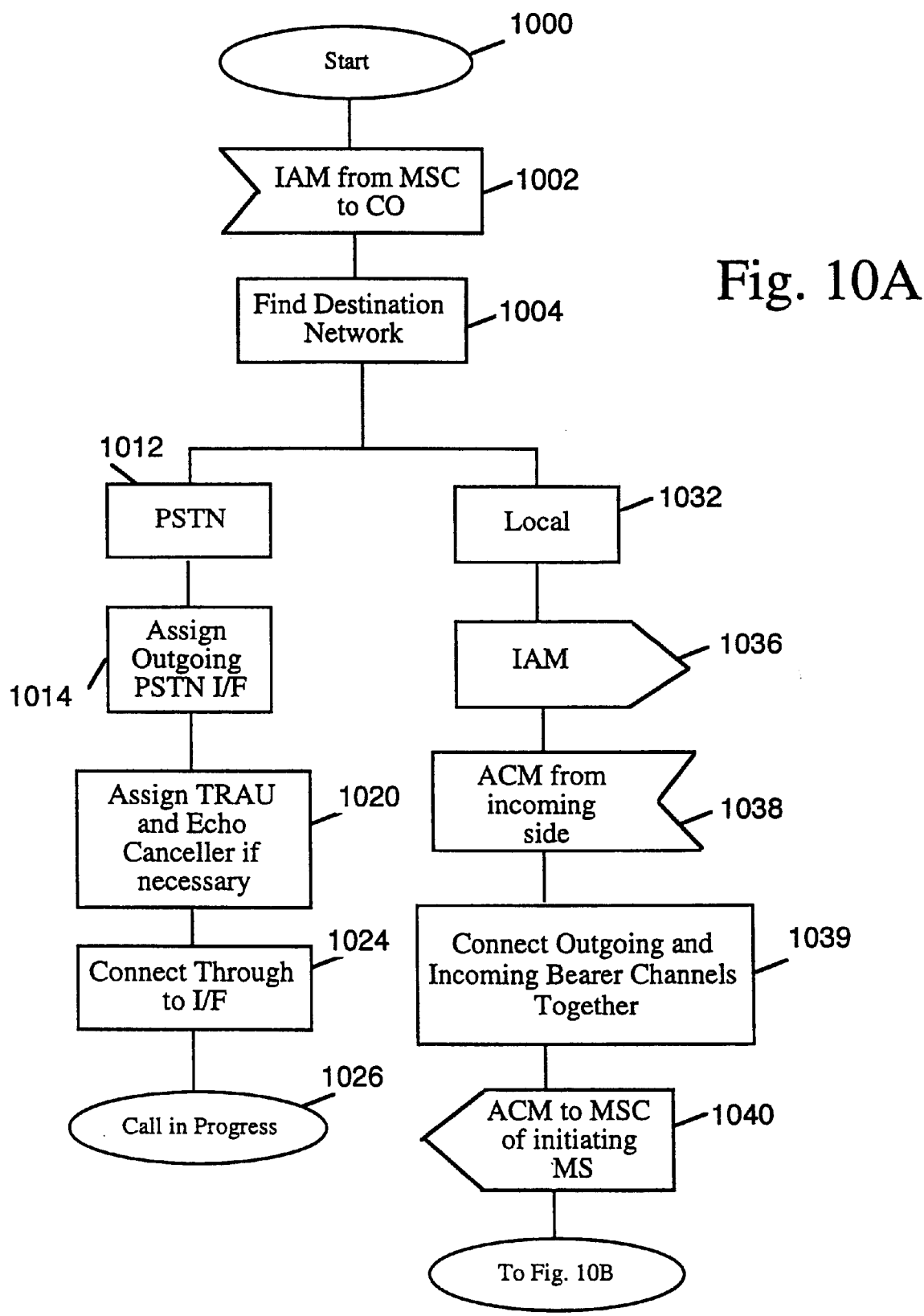
FIG. 10A shows in a flow chart format, from the CACB perspective, the steps taken when an MS unit of the CAS network originates a call.

The process of originating a call by an MS unit of the CAS network, from the CACB perspective, is shown in the steps of FIG. 10 A. FIG. 10A starts at block 1000. In block 1002, the mini CO receives an initial address message (LAM) from the private MSC. In one embodiment, the IAM message typically includes the destination phone number dialed. Furthermore, in the GSM implementation, all digits of the destination phone number typically arrive all at once. In other implementations, the digits may arrive one at a time as the number is being dialed.

In blocks 1004, the destination network, whether it is a PSTN or within the CAS network that originates the call, is found. In one embodiment, the destination network is ascertained by walking through a dialing tree one digit at a time to ascertain the outgoing path. The process next proceeds in one of two branches depending on the call path.

If the called party is a wired phone set in the PSTN network, the process proceeds to block 1012, representing the PSTN path. In this case, the CACB assigns the appropriate interface for communication with the PSTN, e.g., internal interface to public network (IPN) 250 of FIG. 4, in block 1014. Because the destination phone set is located outside the cellular domain, it may be necessary to assign rate conversion and echo canceling resources, i.e., TRAU and echo canceller, if necessary in block 1020.

In block 1024, the process connects the call through to the interface assigned in block 1014, i.e., the internal interface to public network. As can be appreciated by those skilled in the art, block 1024 may further include the exchange of messages, e.g., IAM, ACM, ANM (see, e.g., FIG. 7), and the actual connection from the private MSC to the appropriate interface the GMSC. Thereafter, the call is in progress in block 1026.

If the destination of the call is an MS unit in the domain of the CAS network from which the call is originated, the process proceeds to block 1032, signifying that the incoming call path loops back into the same CACB from which the call is originated and that the actual cross-connection of bearer data channels should be made internally either by the MSC of this CACB or by another functional block, e.g., BSC, BTS, further down the hierarchy (if intelligent cross-connect is involved as is disclosed in co-pending patent application Ser. No. 08/435,838).

In order to complete an incoming call, an IAM message is sent in block 1036. This IAM message does not go out on an external network interface but it is sent to a new process to terminate the incoming call within the CACB. Specifically, the IAM sent in block 1036 is received in block 1102 of FIG. 11 by the process that terminates an incoming call.

In one embodiment, the IAM message may include additional information to indicate that the message in an on-CAS-net type message which may differ from the standard IAM message typically sent off CAS net. In one embodiment, the IAM message may include additional information to identify that different resource requirements, e.g., no echo canceling, no TRAU, as well as the communication rates of the MS units. In some cases, some of the above information may be included in the ACM message as well. Enhanced messages of, for example, IAM, ACM, and ANM (referred to as IAM', ACM', and ANM' for convenience) may be utilized to facilitate, for example, intelligent cross-connecting and TRAUing of call paths. For a more thorough discussion of the use of enhanced messages, reference may be made to the aforementioned co-pending patent application Ser. No. 08/435,838.

Figure 11:
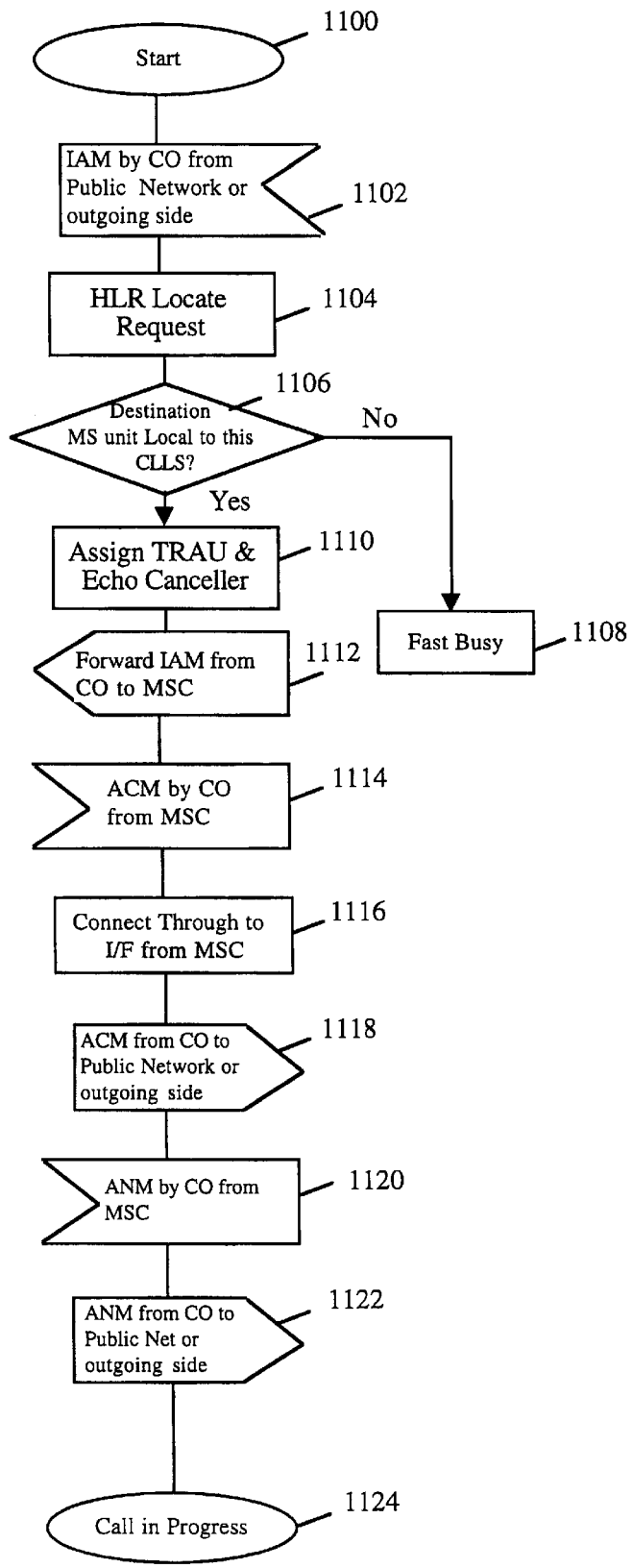
FIG. 11 is a flow chart illustrating the steps taken by the CACB of the present invention, from the CACB perspective, when a call terminates on an MS unit of the CAS network.

In block 1038, the process that initiates the call and sends out the IAM message in block 1036 receives an ACM (address complete message) from the process that terminates the call of FIG. 11. Specifically, this ACM came from block 1118 of FIG. 11. In block 1039, the outgoing and incoming bearer channels are connected together. In block 1039, any required inner working functions (IWF's), e.g., TRAU, echo-cancelling, are also utilized if necessary. Further, intelligent cross-connecting and TRAUing may be involved as discussed in the abovementioned co-pending patent application Ser. No. 08/435,838).

In block 1040, the process that initiates the call and receives the ACM message in block 1038 sends an ACM message to the MSC associated with the outgoing call. From block 1040 of FIG. 10A, the process proceeds to block 1042 of FIG. 10B.

Figure 10B:
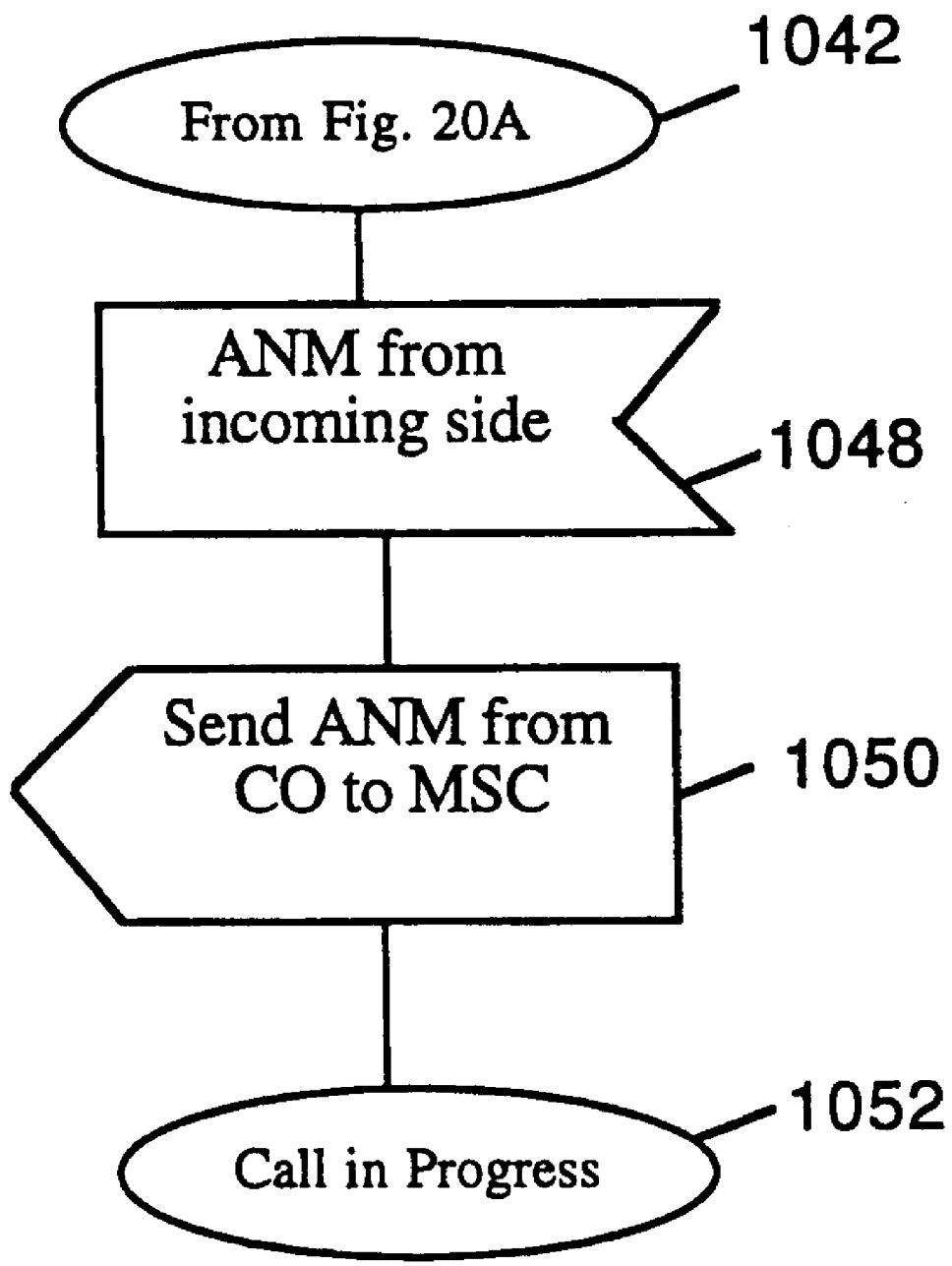
FIG. 10B is a continuation of FIG. 10A.

FIG. 10B is a continuation of FIG. 10A. Referring now to FIG. 10B, the process receives, in block 1048, from the outgoing process of FIG. 11 an ANM message. Specifically, the ANM message is received from block 1122 of FIG. 11. The ANM message indicates that the destination MS unit has answered the call. The block 1050, the mini CO forwards an answer message (ANM) to the MSC associated with the MS unit that initiated the call and sent the IAM message in block 1002 of FIG. 10A.

The process of terminating an incoming call at an MS unit of the CAS network, from the CACB perspective, is shown in the steps of FIG. 11. FIG. 11 starts at block 1100. From block 1100, the process proceeds to block 1102 where an initial address message (IAM) is received from either a public network or from an MS unit in the CAS network. If an MS unit within the CLLLS originated the call then the IAM message received in block 1102 is substantially the same one that was sent from block 1036 of FIG. 10A. In this case, the call is considered an internal call, i.e., a call between two MS's of the same CAS network. In block 1104, the mini CO consults with the CAS HLR registry to locate the destination MS unit in the CAS network. Block 1104 is necessary in the case, for example, where the destination MS unit may have roamed away from its home location area, i.e. out of range, or may have been turned off. If the destination MS unit is not turned on, the signaling session ends after a predetermined time period.

In block 1106, it is ascertained whether the destination MS unit, whose telephone number is encapsulated in the IAM message received in block 1102, is authorized to use the resources of the CAS network to make calls. If the MS is considered to be unavailable, e.g., if it is busy or deemed unreachable, the process proceeds to block 1108, where a fast busy signal may be generated.

On the other hand, if it is determined in blocks 1104 and 1106 that the destination MS unit is currently located in its home location area, the process proceeds to block 1110 wherein the CACB assigns inner working functions as necessary, e.g., echo canceller. In one embodiment, when the call is originated in the public network, the CACB may also assign TRAU.

In block 1112, the mini CO forwards the IAM message received in block 1102 to the MSC. In block 1114, the address complete message (ACM) is received by the mini CO from the MSC signifying that the destination call has received the complete address. In block 1116, the bearer data channel is connected through from the MSC to the appropriate interface. The connecting through between the appropriate interface and the MSC facilitates full duplex communication. In block 1118, the mini CO forwards the ACM message which was received in block 1114 to the public network or, in the case of internal call, back to the originating process of FIG. 10A, which is received in block 1038 therein.

If the party at the destination MS unit picks up the call, the MSC sends an answer message (ANM) message to the mini CO in block 1120. In block 1122, the mini CO forwards the ANM message which was received in block 1120 to the public network or, in the case of internal call, back to the originating process of FIG. 10B, which is received in block 1048 therein to the MSC to signify that the called party has picked up the call. Thereafter, the process proceeds to block 1124 as shown in FIG. 11, wherein the call is in progress.

Although the foregoing invention has been described in some detail for purposes of clarity of understanding, it will be apparent that certain changes and modifications may be practiced within the scope of the appended claims. By way of example, although the invention is discussed herein with reference primarily to a GSM system, it should be noted that the present invention is not so limiting. It is specifically contemplated that the cellular adjunct system disclosed herein may be implemented in systems using other specific protocols. Further, although the present invention uses communication between two MS units to illustrate the inventive concept, it should be noted that conference calls may be made among more than two MS units, e.g. among 3, 4 or more MS units. The adaptation of the disclosed apparatuses and methods to achieve that end is well within the abilities of one skilled in the art. Given this disclosure, it will be apparent to those of ordinary skills in the art that combinations and substitutions may be made without departing from the scope and the spirit of the present invention. Consequently, the scope of the invention is not limited to the specific examples given herein but is set forth in the appended claims.

APPENDIX A

GLOSSARY OF TERMS AND ABBREVIATIONS

Abis: Protocol stack between a BTS and a BSC
ACM: Address Complete Message
ANM: Answer Message
BCF: Base Station Control Function
BSC: Base station Controller
BSS: Base Station Subsystem
BTS: Base Transceiver Station
CACB: Cellular Adjunct Control Block
CAS: Cellular Adjunct System
CC: Call Control Management
CCPU: Cellular CPU
CO: Central Office
cPBX: cellular Private Branch Exchange
DSP: Digital Signal Processing
GMSC: Gateway for MSC
GSM: Global Systems for Mobile Communication
CAS HLR: Home Location Registry
IAM: Initial Address Message
IMSI: International Mobile Subscriber Identifier
IPN: Interface to Public Network
ISDN: Integrated Services Digital Network
IWF: InnerWorking Functions
LAPD-M: Link Access Protocol on the Dm (control) channel
MM: Mobility Management
MS: Mobile Stations
MSC Mobile-Services Switching Center
OMC: Operation and Management Center
PSTN: Public Switched Telephone Network
PBX: Private branch exchange
RF: module Radio Frequency module
RL: Radio Link
RR: Radio Resource Management
SCCP: Signalling Connection Control Part
SMS: Short Message Services
SS: Supplemental Services
TDM data: Time Division Multiplexed Data
TRAU: Transcoder-Rate Adapter Unit
TRX: Transceiver
VLR: Visitor Location Registry
VME: An industry standard bus for interconnecting components
wPBX: wired PBX

APPENDIX B

The present disclosure is written for ease of understanding by those of skill in the art. For others, the following documents, incorporated herein by reference for all purposes, may be reviewed for additional information.

Mouly, Michel & Pautet, Marie-Bernadette, *"The GSM System for Mobile Communications"*, Mouly, Michel & Pautet, Marie-Bernadette, 1992.

European Telecommunications Standards Institute, *"European digital cellular telecommunications system (Phase 2); Mobile radio interface signaling layer 3 General aspects (GSM 04.07)"*, 1994, Valbonne—France.

European Telecommunications Standards Institute, *"European digital telecommunications system (Phase 2): Mobile radio interface layer 3 specification (GSM 04.08)"*, 1994, Valbonne—France.

European Telecommunications Standards Institute, *"European digital cellular telecommunications system (Phase 2): Mobile-services Switching Centre—Base Station System (MSC—BBS) interface Layer 3 specification (GSM 08.08)"* 1994, Valbonne—France.

European Telecommunications Standards Institute, *"European digital cellular telecommunications system (Phase 2); Signaling transport mechanism specification for the Base Station System—Mobile-services Switching Centre (BBS-MSC) interface (GSM 08.06)"*, 1994, Valbonne—France.

European Telecommunications Standards Institute, *"European digital cellular telecommunications system (Phase 2); Base Station Controller—Base Transceiver Station (BSC-BTS) interface Layer 3 specification (GSM 08.58)"*, 1994, Valbonne—France.

European Telecommunications Standards Institute, *"European digital cellular telecommunications system (Phase 2); Mobile Application Part (MAP) specification (GSM 09.02)"*. 1994, Valbonne—France.

European Telecommunications Standards Institute, *"European digital cellular telecommunications system (Phase 2); Signaling requirements on internetworking between the Integrated Services Digital Network (ISDN) or Public Switched Telephone Network (PSTN) and the Public Land Mobile Network (PLMN) (GSM 09.03)"*, 1994, Valbonne—France.

What is claimed is:

1. A cellular adjunct system for extending telephone service offered by a public wired telephone network to a plurality of cellular handsets, said public wired telephone network having wired telephone sets and an operation and maintenance center for managing subscriber data related to both said wired telephone sets and said plurality of cellular handsets, said cellular adjunct system facilitating cellular communication among said plurality of cellular handsets and between said plurality of cellular handsets and said wired telephone sets, said cellular adjunct system being coupled to a base station subsystem, said base station subsystem including radio resource management facilities for permitting said plurality of cellular handsets to communicate with said base station subsystem in a cellular manner, said cellular adjunct system comprising:

a cellular adjunct control block coupled between said base station subsystem and switching networks in said public wired telephone network, said cellular adjunct control block including:

a registry containing routing data related to said plurality of cellular handsets to facilitate routing calls thereto, said routing data including data indicating whether a particular cellular handset in said plurality of cellular handsets is available for receiving a call;

a mobile switching center coupled to said registry, said mobile switching center facilitates switching of calls among said plurality of cellular handsets; and a mini-central office coupled to said registry and said mobile switching center, said mini-central office ascertaining whether signaling data from a first cellular handset of said cellular handsets relates to an internal call or an external call, said internal call being a call between said first cellular handset and a second cellular handset of said plurality of cellular handsets, said external call being a call between said first cellular handset and one of said wired telephone sets in said public wired telephone network, wherein said mini central office utilizes said mobile switching center for switching said internal call if said signaling data relates to said internal call, said signaling data is forwarded to said public wired telephone network for switching said external call if said signaling data relates to said external call, wherein bearer data channels for said internal calls are processed through a transcoder-rate adapter unit only if they facilitate communication among cellular handsets that communicate at different rates.

2. The cellular adjunct system of claim 1 wherein said cellular adjunct control block is coupled to said switching networks via an existing central office in said public wired telephone network.

3. The cellular adjunct system of claim 2 wherein said cellular adjunct control block is coupled to said existing central office using a wireless link.

4. The cellular adjunct system of claim 2 wherein said base station subsystem includes at least a base station controller and a base transmitter station, wherein each of said cellular handsets is confined to a home location area that is equal to a domain of a base transmitter station in said base station for the purpose of initiating and receiving a call.

5. The cellular adjunct system of claim 1 wherein said base station subsystem is a standard GSM base station subsystem.

6. The cellular adjunct system of claim 1 wherein said plurality of cellular handsets represent standard GSM handsets.

7. The cellular adjunct system of claim 1 wherein said base station subsystem includes at least a base station controller and a base transmitter station, wherein each of said cellular handsets is confined to a home location area that is equal to a domain of a base transmitter station in said base station for the purpose of initiating and receiving a call.

8. The cellular adjunct system of claim 1 wherein said cellular adjunct control block includes facilities for gathering billing data relating to usage by said plurality of cellular handsets.

9. The cellular adjunct system of claim 8 wherein said billing data is forwarded to said public network, thereby centralizing processing of billing for both said plurality of cellular handsets and said wired telephone sets.

10. A cellular adjunct system for extending telephone service offered by a public wired telephone network to a plurality of cellular handsets, said public wired telephone network having wired telephone sets and an operation and maintenance center for managing subscriber data related to both said wired telephone sets and said plurality of cellular handsets, said cellular adjunct system facilitating cellular communication among said plurality of cellular handsets and between said plurality of cellular handsets and said wired telephone sets, said cellular adjunct system being coupled to a base station subsystem said base station subsystem including radio resource management facilities for permitting said plurality of cellular handsets to communicate with said base station subsystem in a cellular manner, said cellular adjunct system comprising:

a cellular adjunct control block coupled between said base station subsystem and switching networks in said public wired telephone network said cellular adjunct control block including:
- a registry containing routing data related to said plurality of cellular handsets to facilitate routine calls thereto, said routing data including data indicating whether a particular cellular handset in said plurality of cellular handsets is available for receiving a call;
- a mobile switching center coupled to said registry, said mobile switching center facilitates switching of calls among said plurality of cellular handsets; and
- a mini-central office coupled to said registry and said mobile switching center, said mini-central office ascertaining whether signaling data from a first cellular handset of said cellular handsets relates to an internal call or an external call, said internal call being a call between said first cellular handset and a second cellular handset of said plurality of cellular handsets, said external call being a call between said first cellular handset and one of said wired telephone sets in said public wired telephone network, wherein said mini central office utilizes said mobile switching center for switching said internal call if said signaling data relates to said internal call, said signaling data is forwarded to said public wired telephone network for switching said external call if said signaling data relates to said external call said cellular adjunct control block includes facilities for gathering billing data relating to usage by said plurality of cellular handset wherein said billing data is forwarded to said public network, thereby centralizing processing of billing for both said plurality of cellular handsets and said wired telephone sets.

11. The cellular adjunct system of claim 10 wherein bearer data channels for said internal calls are processed through a transcoder-rate adapter unit only if they facilitate communication among cellular handsets that communicate at different rates.

12. The cellular adjunct system of claim 10 wherein said cellular adjunct control block is coupled to said switching networks via an existing central office in said public wired telephone network.

13. The cellular adjunct system of claim 12 wherein said cellular adjunct control block is coupled to said existing central office using a wireless link.

14. The cellular adjunct system of claim 12 wherein said base station subsystem includes at least a base station controller and a base transmitter station, wherein each of said cellular handsets is confined to a home location area that is equal to a domain of a base transmitter station in said base station for the purpose of initiating and receiving a call.

15. The cellular adjunct system of claim 9 wherein said base station subsystem is a standard GSM base station subsystem.

16. The cellular adjunct system of claim 9 wherein said plurality of cellular handsets represent standard GSM handsets.

17. The cellular adjunct system of claim 9 wherein said base station subsystem includes at least a base station controller and a base transmitter station, wherein each of said cellular handsets is confined to a home location area that is equal to a domain of a base transmitter station in said base station for the purpose of initiating and receiving a call.

18. A method for extending telephone service offered by a public wired telephone network to a plurality of standard cellular handsets without implementing a standard cellular network, said plurality of standard cellular handsets communicating with a base station subsystem having a base station controller and a base transceiver station in a cellular manner via radio resource management facilities therein, said method comprising:
- restricting the mobility of each of said plurality of standard cellular handsets to a single base transceiver station;
- providing a cellular adjunct control block coupled between said base station subsystem and switching networks in said public wired telephone network, said cellular adjunct control block including:
  - a registry containing cellular handset data related to said plurality of standard cellular handsets to facilitate routing calls thereto, said cellular handset data including data indicating a home base transceiver station of a given standard cellular handset of said plurality of standard cellular handsets and whether said given cellular handset in said plurality of cellular handsets is available for receiving a call;
  - a mobile switching center coupled to said registry, said mobile switching center facilitates switching calls among said plurality of cellular handsets; and
  - a mini-central office coupled to said registry and said mobile switching center, said mini-central office ascertaining whether signaling data from a first cellular handset of said cellular handsets relates to an internal call or an external call, said internal call being a call between said first cellular handset and a second cellular handset of said plurality of cellular handsets and said external call being a call between said first cellular handset and a wired telephone set in said public wired telephone network, wherein said mini central office utilizes said mobile switching center for switching said internal call if said signaling data relates to said internal call while said signaling data is forwarded to said public wired telephone network for switching said external call if said signaling data relates to said external call, wherein said public wired telephone network routes calls to and from said plurality of cellular handsets via said cellular adjunct control block as if said plurality of cellular handsets were wired telephones in said public wired telephone network; and
- furnishing subscriber data related to said plurality of standard cellular handsets to said public wired telephone network to centralize subscriber services related to said plurality of standard cellular handsets.

19. The method of claim 18 further comprising the step of forwarding, using said cellular adjunct control block, billing data related to cellular usage by said plurality of standard cellular handsets to said public wired telephone network to centralize billing services related to said plurality of standard cellular handsets through said public wired telephone network.

20. The method of claim 18 wherein said plurality of standard cellular handsets represent standard GSM handsets.

21. The method of claim 18 further comprising processing a bearer data channels for said internal call through a transcoder-rate adapter unit only if said internal call facilitates communication among cellular handsets that communicate at different rates.

22. The method of claim 18 wherein said providing said cellular adjunct control block includes coupling said cellular adjunct control block to said switching networks via an existing central office in said public wired telephone network.

23. The method of claim 22 wherein said cellular adjunct control block is coupled to said existing central office using a wireless link.

24. The method of claim 22 wherein said base station subsystem includes at least a base station controller and a base transmitter station, wherein each of said cellular handsets is confined to a home location area that is equal to a domain of a base transmitter station in said base station for the purpose of initiating and receiving a call.

25. The method of claim 18 wherein said base station subsystem is a standard GSM base station subsystem.

26. The method of claim 18 wherein said plurality of cellular handsets represent standard GSM handsets.

27. The method of claim 18 wherein said base station subsystem includes at least a base station controller and a base transmitter station, wherein each of said cellular handsets is confined to a home location area that is equal to a domain of a base transmitter station in said base station for the purpose of initiating and receiving a call.

* * * * *